(12) United States Patent
Ko

(10) Patent No.: US 7,930,008 B2
(45) Date of Patent: Apr. 19, 2011

(54) MOBILE TERMINAL AND SWIVEL ASSEMBLY COUPLED THERETO

(75) Inventor: Deok-Gyu Ko, Suwon-si (KR)

(73) Assignee: LG Electronics Inc., Seoul (KR)

( * ) Notice: Subject to any disclaimer, the term of this patent is extended or adjusted under 35 U.S.C. 154(b) by 768 days.

(21) Appl. No.: 11/864,558

(22) Filed: Sep. 28, 2007

(65) Prior Publication Data

US 2008/0081678 A1    Apr. 3, 2008

(30) Foreign Application Priority Data

Sep. 29, 2006  (KR) .................. 10-2006-0096377

(51) Int. Cl.
*H04M 1/00*    (2006.01)
(52) U.S. Cl. ............... 455/575.4; 455/575.1; 455/566; 455/90.3
(58) Field of Classification Search .......... 455/575.4, 455/575.3, 575.1, 566, 90.3, 100, 354; 345/158; 361/679, 681
See application file for complete search history.

(56) References Cited

U.S. PATENT DOCUMENTS

| | | | |
|---|---|---|---|
| 6,170,940 B1 * | 1/2001 | Shinada et al. | 347/86 |
| 2004/0257752 A1 * | 12/2004 | Lee | 361/679 |
| 2005/0217884 A1 * | 10/2005 | Yano et al. | 174/50 |
| 2006/0103631 A1 * | 5/2006 | Mashima et al. | 345/158 |
| 2006/0135225 A1 * | 6/2006 | Lin et al. | 455/575.3 |
| 2006/0238164 A1 * | 10/2006 | Rosal et al. | 320/115 |
| 2006/0293095 A1 * | 12/2006 | Takagi | 455/575.3 |
| 2007/0293283 A1 * | 12/2007 | Inubushi et al. | 455/575.1 |
| 2008/0055829 A1 * | 3/2008 | Ko et al. | 361/681 |

* cited by examiner

*Primary Examiner* — Tan Trinh
(74) *Attorney, Agent, or Firm* — Birch, Stewart, Kolasch & Birch, LLP

(57) ABSTRACT

A mobile terminal including a first body, a second body, and a swivel assembly to couple the first and second bodies to each other so as to rotate and slide the first and second bodies with respect to each other. Here, one of the first and second bodies includes a moving path disposed according to a sliding direction thereof. Moreover, the swivel assembly includes a moving unit slidably coupled to the moving path and a fixed unit mounted at one side of another one of the first and second bodies. The another one of the first and second bodies does not have the moving path thereon, and is rotatably coupled to the moving unit.

20 Claims, 23 Drawing Sheets

MOBILE TERMINAL AND SWIVEL ASSEMBLY COUPLED THERETO

RELATED APPLICATION

The present disclosure relates to subject matter contained in priority Korean Application No. 10-2006-0096377, filed on Sep. 29, 2006, which is herein expressly incorporated by reference in its entirety.

BACKGROUND OF THE INVENTION

1. Field of the Invention

The present invention relates to a mobile terminal that can perform a rotation motion and a sliding motion, and a swivel assembly mounted at the mobile terminal.

2. Discussion of the Background

Mobile phones (e.g., mobile communication terminals, handsets, wireless communication devices, etc.) are being developed to handle increased capabilities and functions. Different operation modes may be performed. Examples of operation modes may include a system management mode, a phone book mode, an entertainment (or games) mode, and the like.

Various outputs are performed according to each mode of the mobile terminal. Namely, an outputting unit outputs various screens in a horizontal direction or a vertical direction according to each function of the mobile terminal. For example, when the mobile terminal is in a calling mode, an output is performed in a longitudinal direction of the mobile terminal. On the contrary, when the mobile terminal is in a media mode such as a TV mode, an output is performed in a horizontal direction of the mobile terminal.

The output may be performed at various mobile terminals such as a bar-type, a slide-type, a folder-type and a swivel-type. Accordingly, a structure of a mobile terminal corresponding to each output is required. In a so-called 'swivel-type mobile terminal one body is rotatable so as to perform an output in horizontal and vertical directions. The swivel-type mobile terminal is configured so that a body having the outputting unit can be disposed in horizontal and vertical directions by sequentially rotating by 90° and 180°. The rotation of the body having the outputting unit can be stopped at each 90° by a stopper provided at the body.

Outputs of the swivel-type mobile terminal in horizontal and vertical directions are not stably performed. Furthermore, because the body having the outputting unit is frequently rotated, a member (or a unit, or an assembly) mounted to rotate the body can be damaged or abraded.

SUMMARY OF THE INVENTION

Accordingly, one object of the present invention is to address the above-noted and other objects.

Another object of the present invention is to provide a mobile terminal capable of arranging a body having an outputting unit in a horizontal direction or in a vertical direction so as to perform an output according to each function of the mobile terminal.

Yet another object of the present disclosure is to provide a mobile terminal capable of stably operating a body having an outputting unit and arranged in a horizontal direction or in a vertical direction according to each output state corresponding to each function of the mobile terminal.

Another object of the present invention is to provide a mobile terminal capable of sliding and rotating a body having an outputting unit so as to perform an output in horizontal and vertical directions.

Yet another object of the present invention is to provide a mobile terminal capable of independently or dependently sliding and rotating a body having an outputting unit so as to perform an output in a horizontal and a vertical directions.

Still another object of the present invention is to provide a mobile terminal capable of reducing an entire size thereof by rotating or sliding a body having an outputting unit according to an output state in a horizontal direction or a vertical direction.

To achieve these and other advantages and in accordance with the purpose of the present disclosure, as embodied and broadly described herein, the present invention provides in one aspect, a mobile terminal including a first body, a second body, and a swivel assembly to couple the first and second bodies to each other so as to rotate and slide the first and second bodies with respect to each other. Here, one of the first and second bodies includes a moving path disposed according to a sliding direction thereof. Moreover, the swivel assembly includes a moving unit slidably coupled to the moving path and a fixed unit mounted at one side of another one of the first and second bodies. The another one of the first and second bodies does not have the moving path thereon, and is rotatably coupled to the moving unit.

In another aspect, the present invention provides a mobile terminal including a first body, a second body, and a swivel assembly to couple the first and second bodies to each other so as to rotate and slide the first and second bodies with respect to each other. Here, one of the first and second bodies includes a moving path disposed according to a sliding direction thereof, and another one of the first and second bodies not having the moving path thereon includes one or more guides of a linear shape and an arc shape. The one of the first and second bodies having the moving path thereon includes a slider that moves along the guides. Further, the swivel assembly includes a moving unit slidably coupled to the moving path and a fixed unit mounted at one side of the another one of the first and second bodies not having the moving path thereon, and rotatably coupled to the moving unit.

In still another aspect, the present invention provides a swivel assembly including a fixed unit having a cam member, a moving unit and a stopper disposed in the stopper receiving portion and supported by an elastic member. Here, the moving unit includes a cam receiving portion for receiving the cam member, and one or more stopper receiving portions disposed at the cam receiving portion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings:

FIG. 5A is a view showing a state that a second body of the mobile terminal of FIG. 7 is upwardly moved by being slid;

DETAILED DESCRIPTION OF THE INVENTION

Reference will now be made in detail to the preferred embodiments of the present disclosure, examples of which are illustrated in the accompanying drawings.

A mobile terminal according to preferred embodiments of the present invention is operated by a combination method between a sliding method and a rotating method (swivel, swing, etc.). Hereinafter, a mobile terminal that can be rotated and slid, and a swivel assembly mounted at the mobile terminal will be explained in more detail. The swivel assembly indicates a rotating body to couple two bodies to each other so as to be rotated (swivel, swing, etc.).

Figure 1:
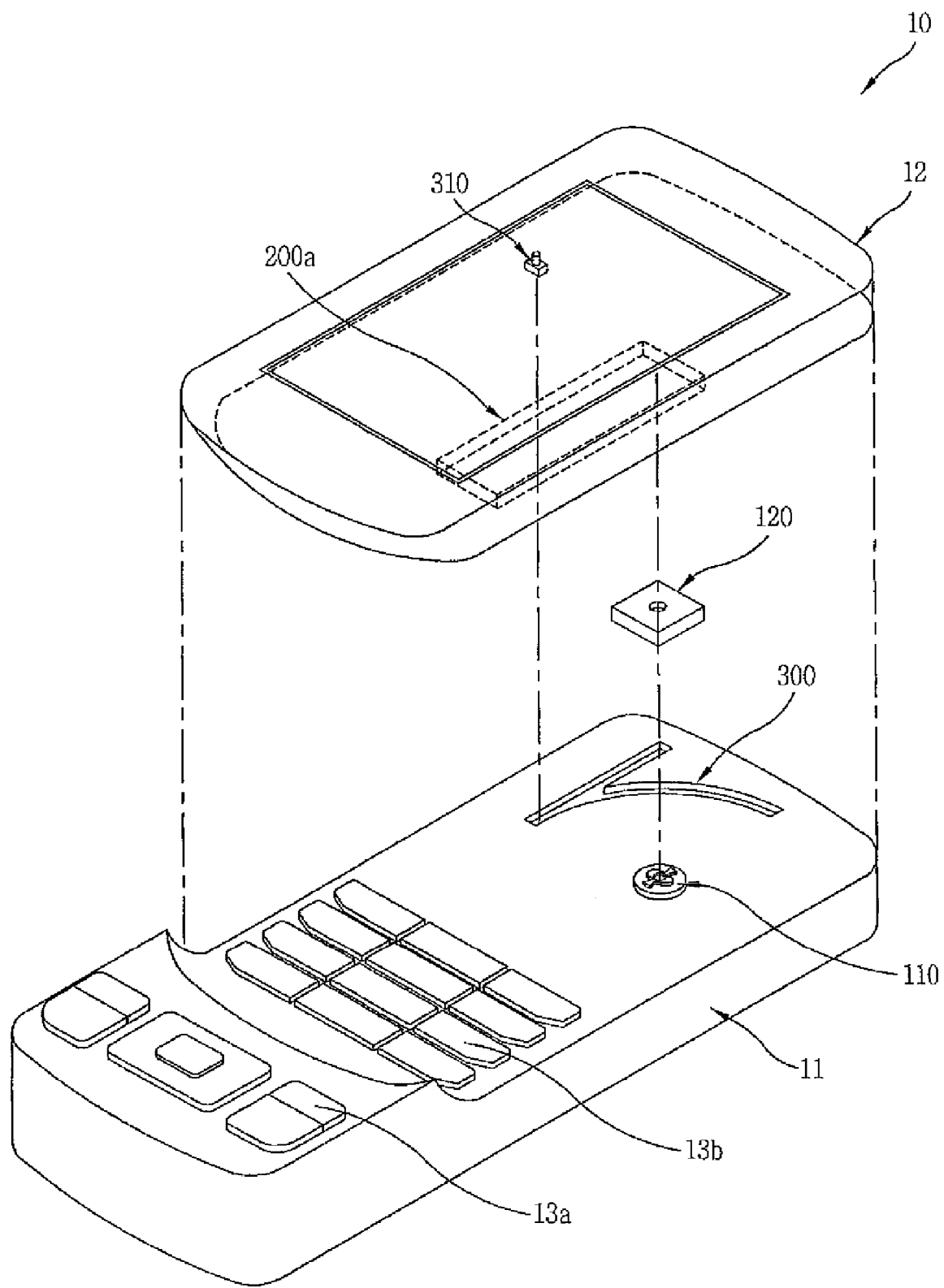
FIG. 1 is an exploded perspective view showing a mobile terminal having a swivel assembly according to a first embodiment of the present disclosure.
Figure 2A:
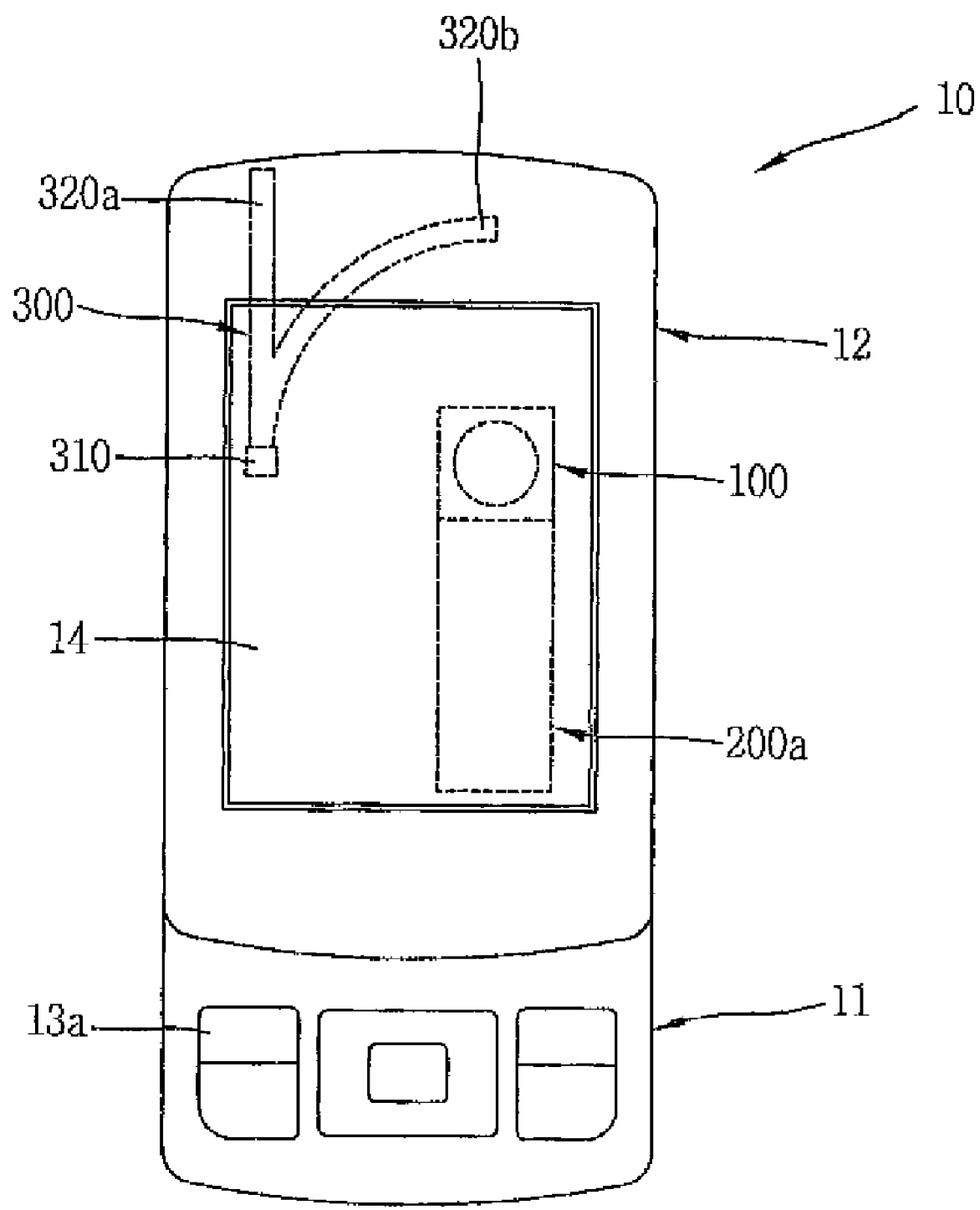
FIG. 2A is a frontal view of the mobile terminal of FIG. 1.
Figure 2B:
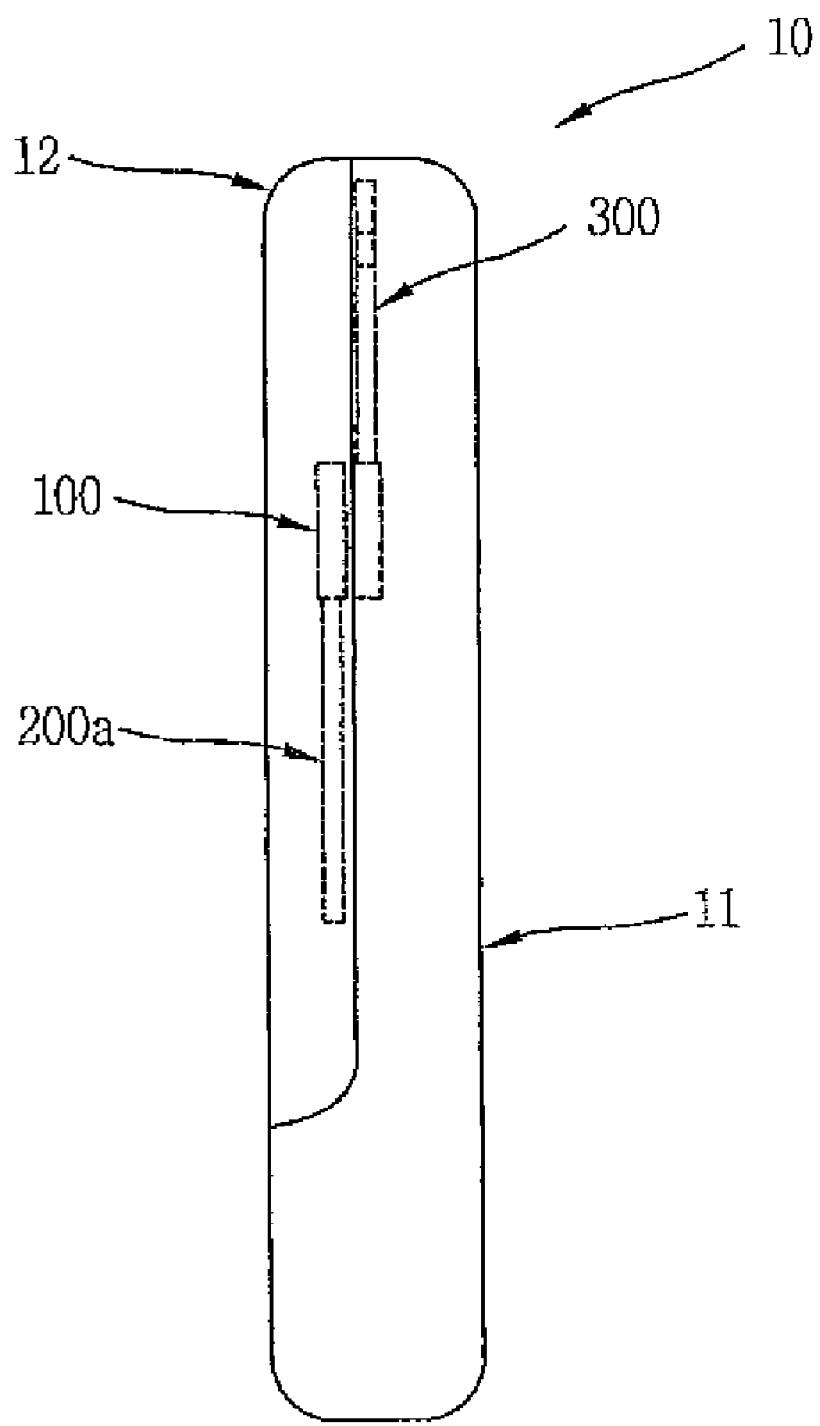
FIG. 2B is a right side view of the mobile terminal of FIG. 1.

As shown in FIGS. 1 to 2B, a mobile terminal 10 according to a first embodiment of the present invention includes a first body 11 having inputting units 13a and 13b (e.g., a key-pad, a wheel button, a navigation key, etc.), and a second body 12 having an outputting unit 14 such as a display. The inputting units 13a and 13b and the outputting unit 14 is disposed at each of the first body 11 and the second body 12. However, the present disclosure is not limited to the above structure. An inputting unit such as a microphone may be provided at the first body 11, and an outputting unit such as a speaker may be provided at the second body 12.

The mobile terminal 10 is implemented to be slidable and rotatable. For instance, the second body 12 is slidable with respect to the first body 11 in a longitudinal direction of the mobile terminal 10 (a vertical direction in drawing). The second body 12 is rotated (swivel or swing) by a predetermined angle (e.g., 90°) with respect to the first body 11.

In order for the mobile terminal 10 to be slidable and rotatable, the first and second bodies 11 and 12 are coupled to each other by a swivel assembly 100, and the swivel assembly 100 is configured to be movable along a moving path 200a formed at one of the first and second bodies 11 and 12.

Here, the swivel assembly 100 moves under a state that one of the first and second bodies 11 and 12 having the moving path 200a thereon is fixed, which means that the swivel assembly 100 moves (slides, transfers, etc.) under a state that one of the first and second bodies 11 and 12 having the moving path 200a thereon is coupled to the swivel assembly.

Referring to FIG. 1, the swivel assembly 100 includes a fixed unit 110 and a moving unit 120. The fixed unit 110 and the moving unit 120 are coupled to the first body 11 and the second body 12, respectively. The moving path 200a is provided at the second body 12, and the moving unit 120 is slidably mounted at the moving path 200a. The moving unit 120 is rotatably coupled to the fixed unit 110 fixed to the first body 11.

The moving path 200a is formed at the second body 12. A moving path according to another embodiment can also be formed at the second body 12. The moving unit 120 of the swivel assembly 100 is slidably mounted at the moving path 200a. However, the present invention is not limited to the above structure.

According to the first embodiment, the moving path 200a is formed at the second body 12 in a longitudinal direction. Also, the moving unit 120 of the swivel assembly 100 is slidably coupled to the moving path 200a so that the second body 12 can be slidable with respect to the first body 11.

The swivel assembly 100 according to the first embodiment is shown in FIGS. 10 to 12B. The swivel assembly includes a fixed unit 110 fixed to one body, and a moving unit 120 slidably mounted at the other body. The fixed unit 110 is mounted at the first body 11, and the moving unit 120 is slidably mounted at the second body 12. The moving unit 120 is rotatably coupled to the fixed unit 110.

The moving unit 120 is configured to have a predetermined gap from the fixed unit 110 so as to prevent friction or an interference occurrence between the first body 11 and the second body 12 being rotated with respect to the first body 11. When the swivel assembly 100 is mounted at the mobile terminal, by a general structure, the moving unit 120 and the fixed unit 110 may have no gap therebetween.

Figure 13:
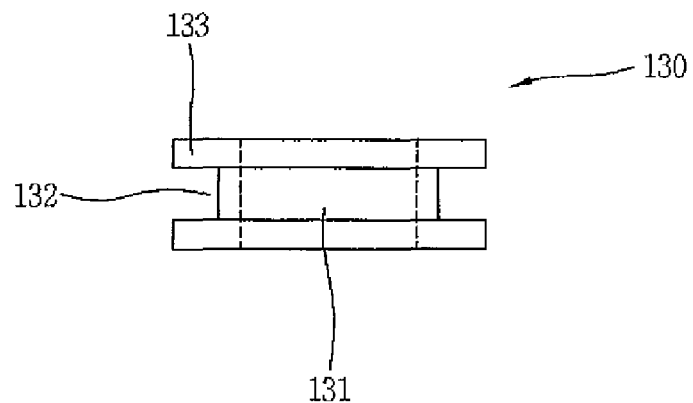
FIG. 13 is a view showing a coupling member of the swivel assembly of FIG. 10.

As shown in FIG. 13, the moving unit 120 and the fixed unit 110 have no gap therebetween by using a coupling member 130. Here, a position where the swivel assembly 100 is mounted may be different from the position when no coupling member 130 is used.

Figure 11A:
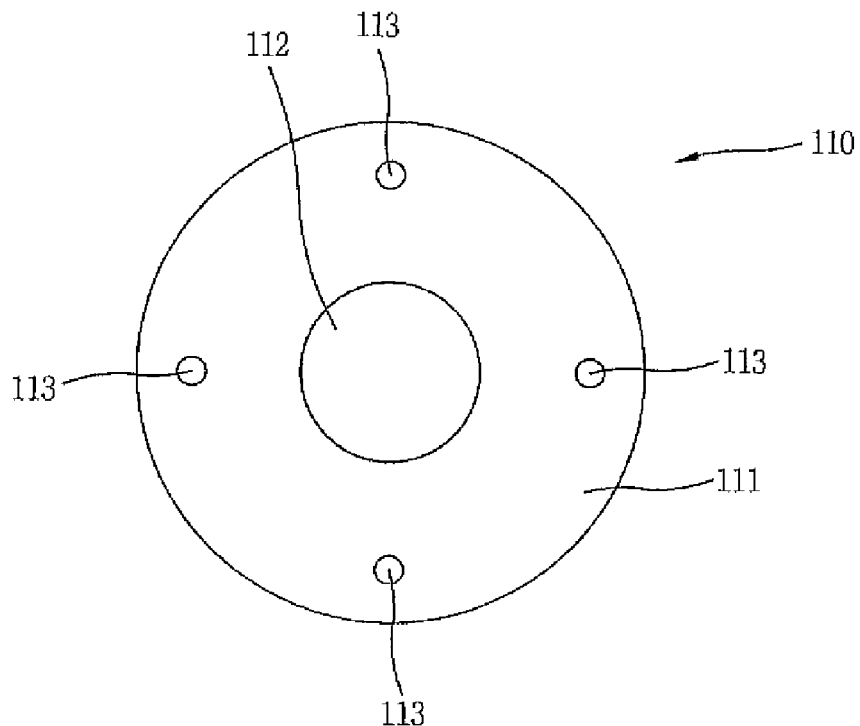
FIG. 11A is a planar view showing a fixed unit of the swivel assembly of FIG. 10.
Figure 11B:
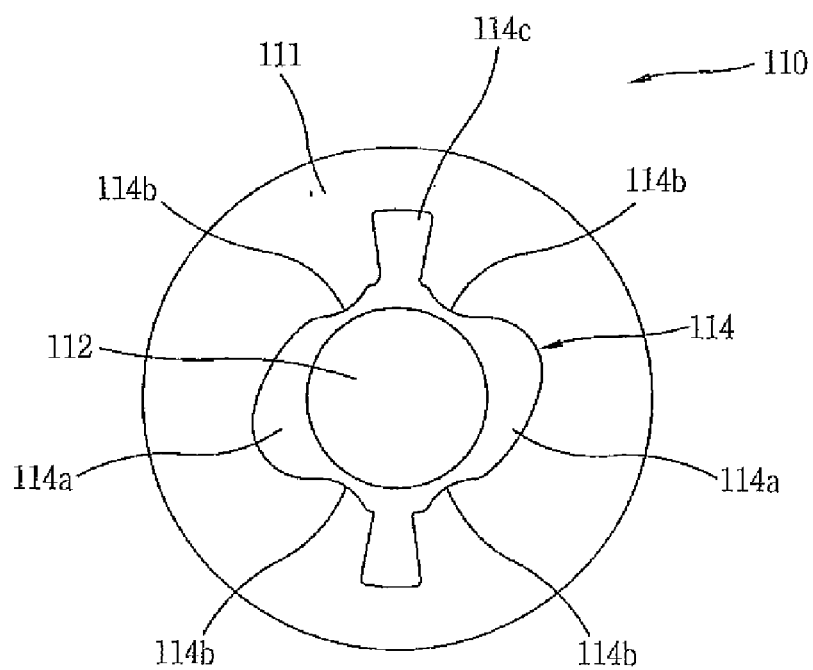
FIG. 11B is a bottom view showing the fixed unit of the swivel assembly of FIG. 10.
Figure 11C:
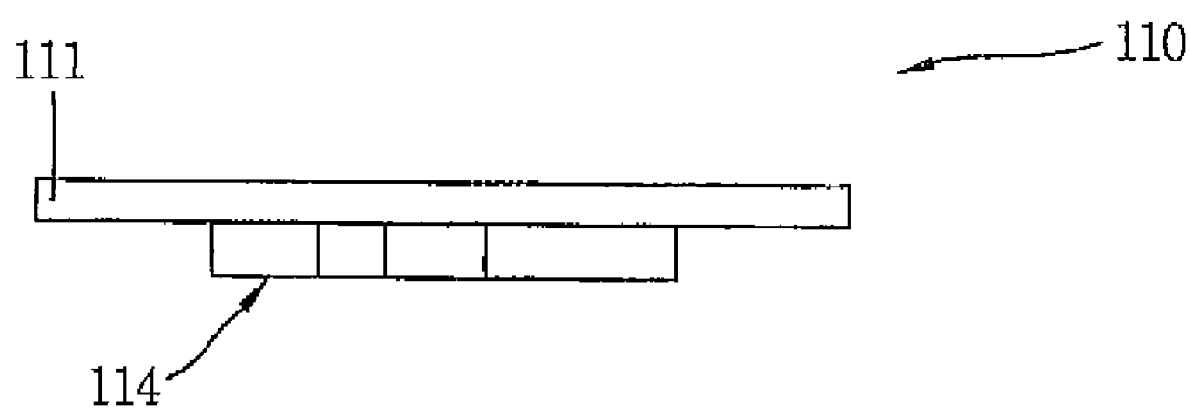
FIG. 11C is a frontal view showing the fixed unit of the swivel assembly of FIG. 10.

The fixed unit 110 of the swivel assembly 100 is shown in FIGS. 11A to 11C. A plurality of holes 113 are formed on one side of the fixed unit 110 so as to be fixed to the first body 11. A cam member 114 is formed on another side of the fixed unit 110 so that the swivel assembly 100 can be rotated in a semi-automatic state. The cam member 114 has a plurality of convex portions 114a and a plurality of concave portions 114b. The convex portions 114a and the concave portions 114b face each other so that the moving unit 120 can rotate by each 90° with respect to the fixed unit 110.

One or more cam member protrusions 114c are formed at the cam member 114 so that the swivel assembly 100 can not be rotated by an angle more than a predetermined angle. The swivel assembly 100 can not be rotated by an angle more than a predetermined angle (e.g., 90°) by engaging a cam receiving portion protrusion 127 of the moving unit 120 to the cam member protrusion 114c of the cam member 114. For example, the cam receiving portion protrusion 127 prevents further rotation of the swivel assembly 100 when the cam member protrusion 114c reaches the cam receiving portion protrusion 127 during rotation. As shown in FIG. 11B, the cam member protrusion 114c of the cam member 114 is configured in one pair so that the convex portions 114a and the concave portions 114b face each other.

The fixed unit 110 is further provided with a fixed unit opening 112 at a central portion thereof. The fixed unit opening 112 forms an opening A at a central portion of the swivel assembly 100 together with a moving unit opening 122 of the moving unit 120. The opening A of the swivel assembly 100 is implemented for a connection member such as a flexible printed circuit board (FPCB) for electrically connecting the two bodies 11 and 12 to each other.

Figure 12A:
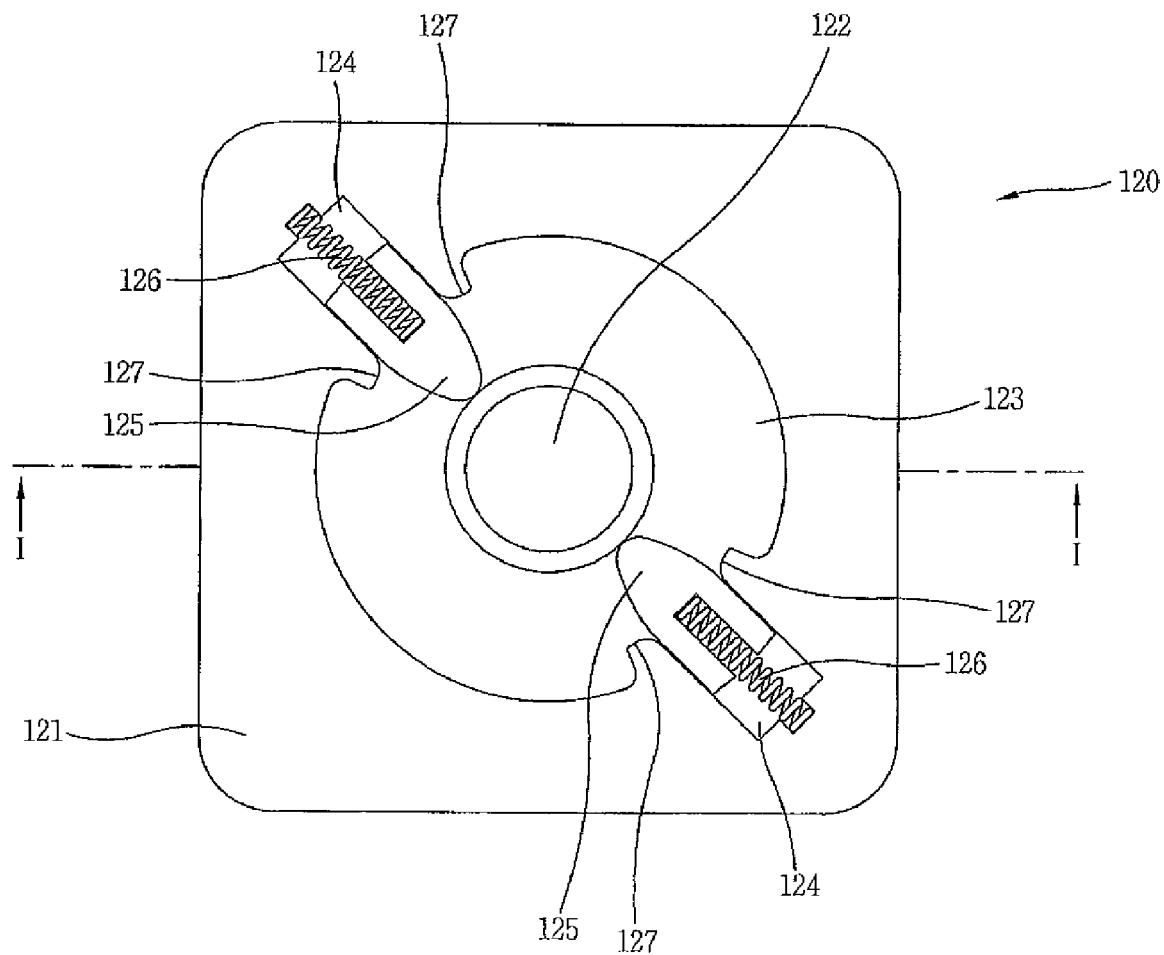
FIG. 12A is a planar view showing a moving unit of the swivel assembly of FIG. 10.
Figure 12B:
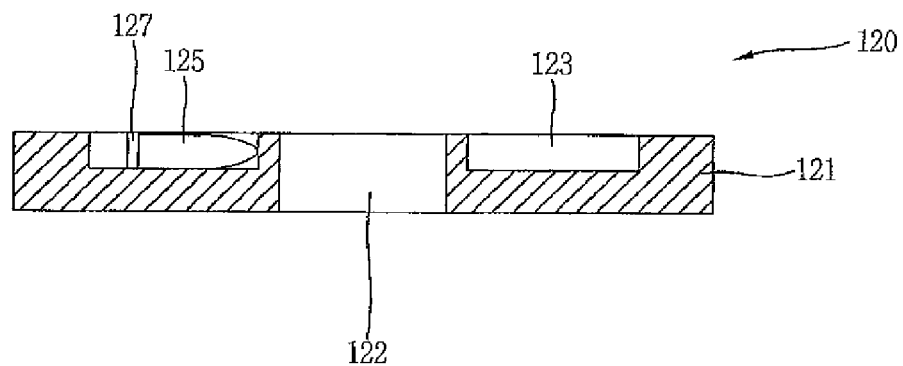
FIG. 12B is a sectional view showing the moving unit taken along line 'I-I' of FIG. 12A.

As shown in FIGS. 12A and 12B, a cam receiving portion 123 for receiving the cam member 114 is formed at a body 121 of the moving unit 120 corresponding to the cam member 114. One or more cam receiving portion protrusions 127 is formed at the cam receiving portion 123. A stopper 125 supported by an elastic member 126 is mounted at the moving unit 120 so that the swivel assembly 100 can be rotated in a semi-automatic state by being interworked with the cam member 114. The stopper 125 is mounted at one or more stopper receiving units 124 extending from the cam receiving portion 123. Further, the stopper 125 mounted at the stopper receiving unit 124 is coupled to the convex portions 114a or the concave portions 114b of the cam member 114 by being supported by the elastic member 126, thereby controlling the swivel assembly 100 to be rotated step by step. For example, the stopper 125 engaged on the cam member 144 guides the rotation towards the convex portion 114a by the elasticity of the elastic member 126 if the stopper is engaged on the concave portion 114a. A moving unit opening 122 corresponding to the fixed unit opening 112 of the fixed unit 110 is formed at a central portion of the moving unit 120.

As a modification example of the swivel assembly 100, as shown in FIG. 13, the fixed unit 110 and the moving unit 120 are integrally coupled to each other by a coupling member 130. The coupling member 130 has a structure of a flange. Further, an inserting unit 132 is formed at a central portion of the coupling member 130, and a coupling member protrusion 133 is formed at both ends of the inserting unit 132. A hole 131 for a connection member such as a flexible printed circuit board (FPCB) is formed at a central portion of the coupling member 130.

Figure 14:
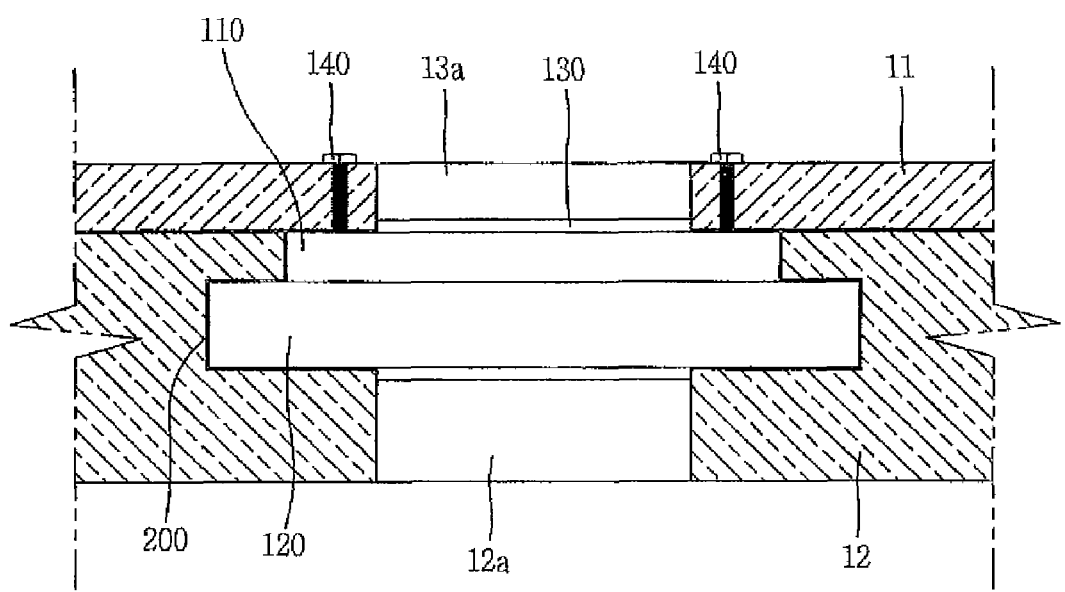
FIG. 14 is a sectional view showing a state that the swivel assembly is mounted at the mobile terminal according to the present disclosure.
Figure 15A:
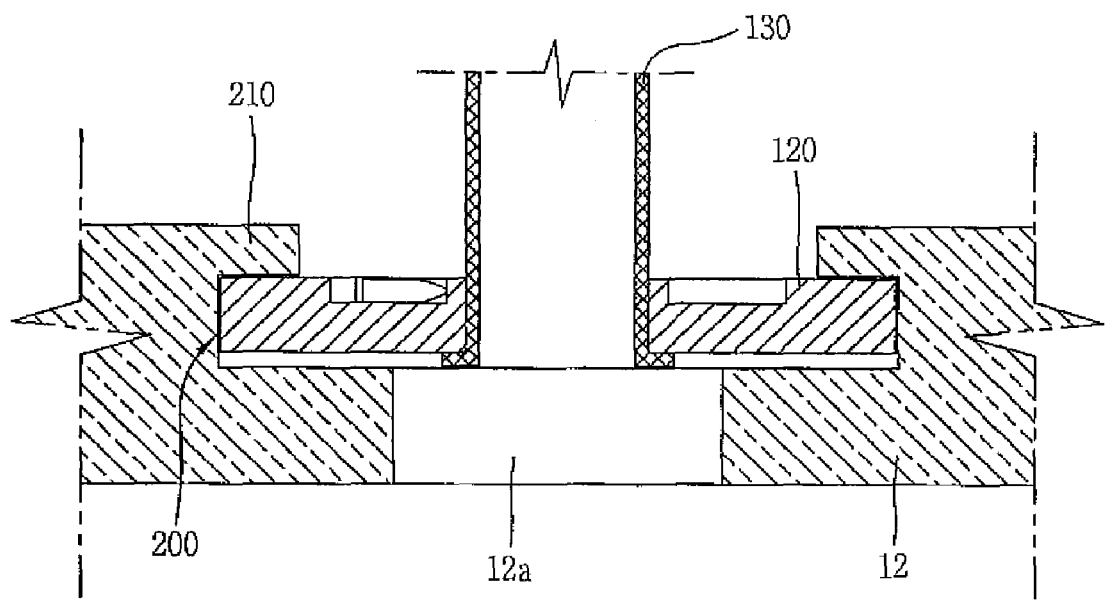
FIG. 15A is a sectional view showing a state that a moving unit of the swivel assembly of FIG. 14 is mounted at a second body.
Figure 15B:
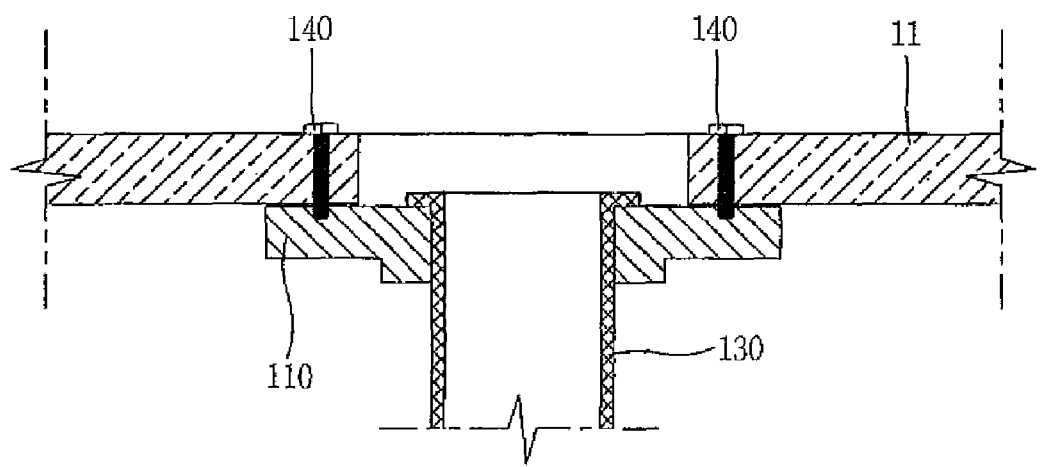
FIG. 15B is a sectional view showing a state that a fixed unit of the swivel assembly of FIG. 14 is mounted at a first body.

As shown in FIGS. 14 to 15B, the swivel assembly 100 is applied to the mobile terminal 10. For instance, the fixed unit 110 of the swivel assembly 100 is fixed to the first body 11 by a coupling opening 140, and the moving unit 120 of the swivel assembly 100 is slidably coupled to the moving path 200a formed at the second body 12.

A moving unit separation preventing jaw 12a for preventing the moving unit 120 from being separated from the moving path 200 is further formed at the moving path 200 where the moving unit 120 is positioned. Although not shown in the drawings, a separation preventing member having a structure of a plate and having an area wider than that of the moving unit 120 may be coupled to a side surface of the moving unit 120. Here, the separation preventing member is positioned inside a case of the second body 120 under a state that the moving unit 120 is positioned at the moving path 200, thereby preventing the moving unit 120 from being separated from the second body 120.

As still another modification example, the fixed unit 110 and the moving unit 120 of the swivel assembly 100 may have a predetermined gap therebetween, so that the mobile terminal performs a sliding motion under a state that the case of the second body 12 is positioned between the fixed unit 110 and the moving unit 120.

Figure 3A:
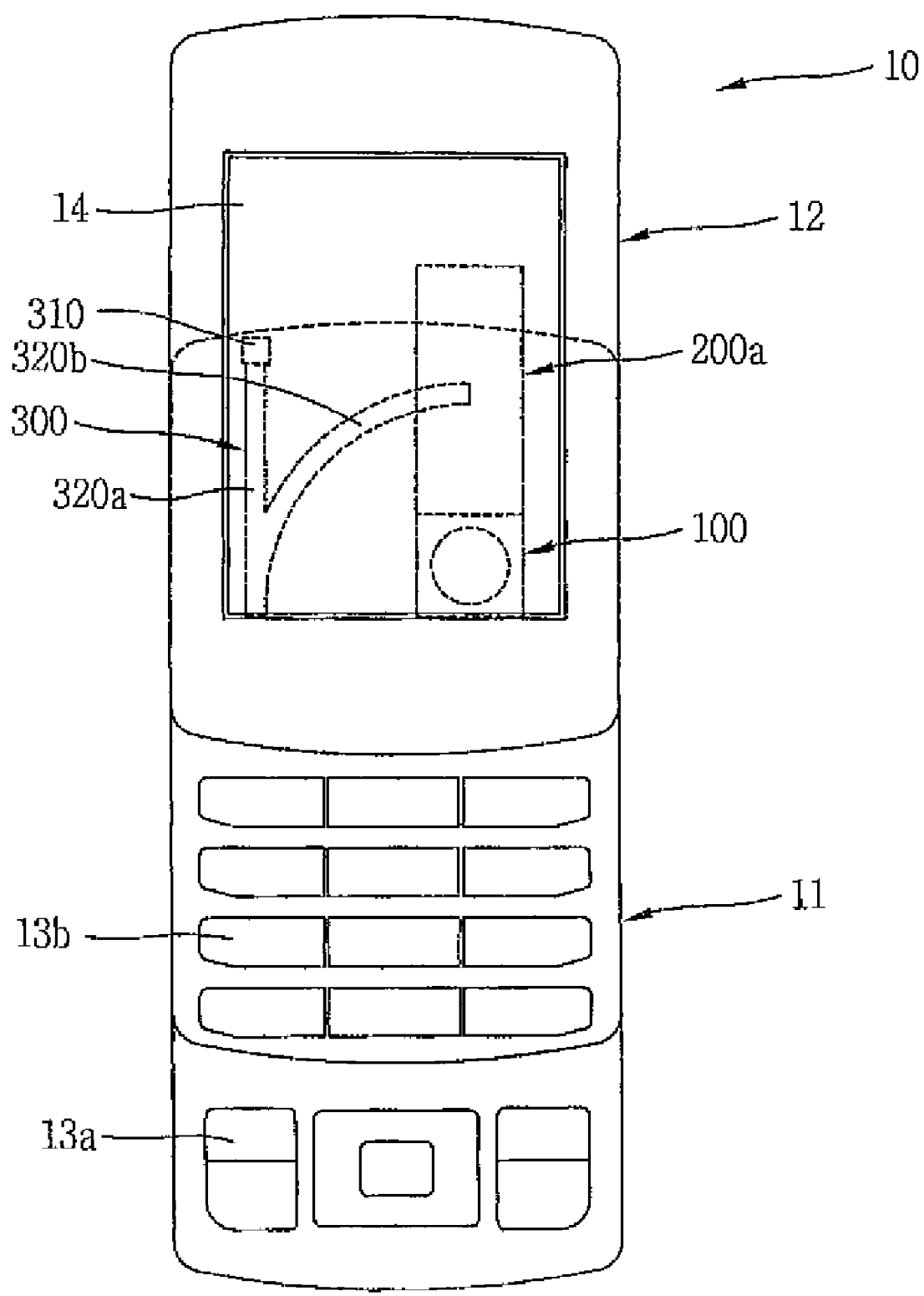
FIG. 3A is a view showing a state that a second body of the mobile terminal of FIG. 1 is upwardly moved by being slid.
Figure 3B:
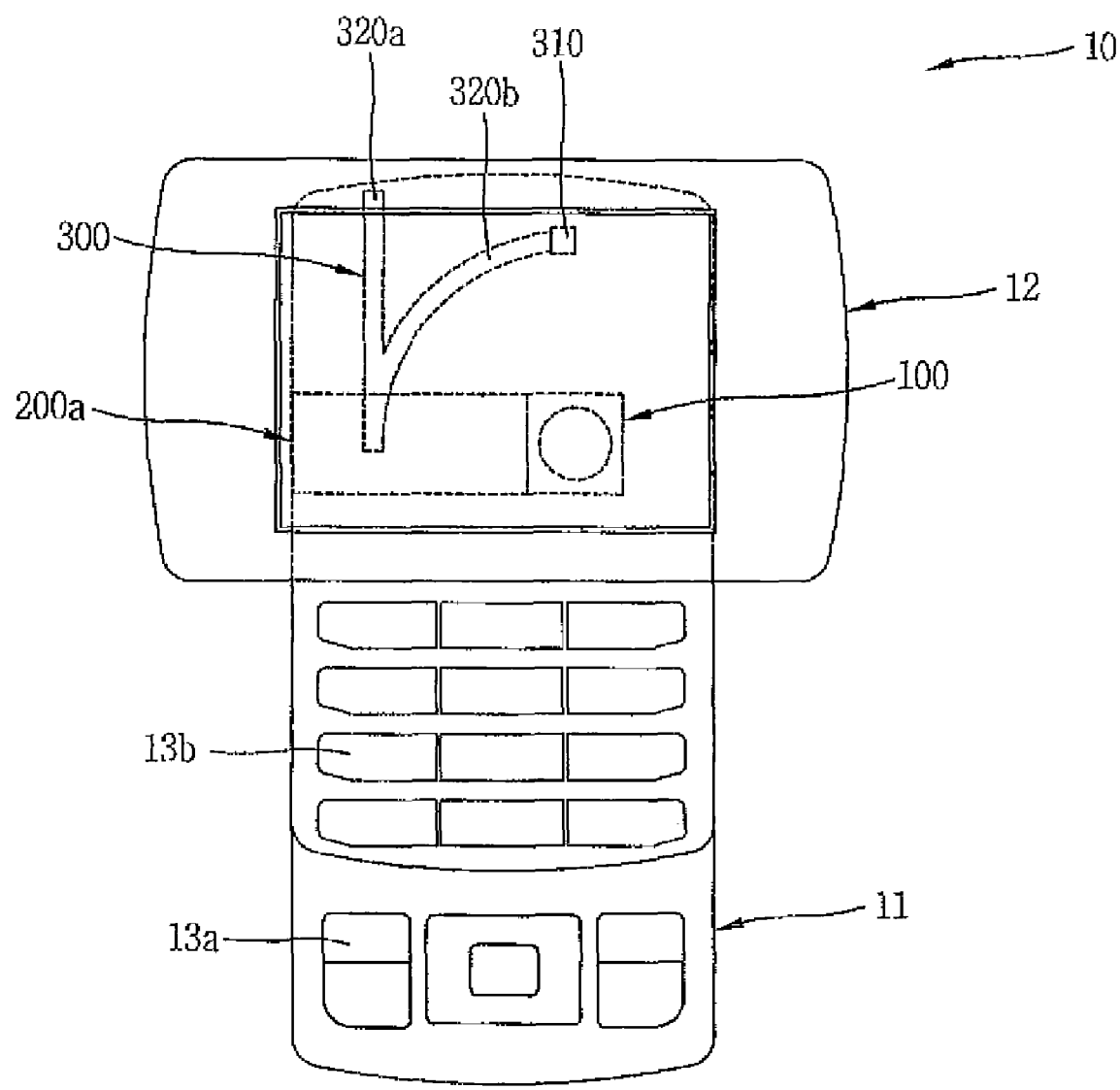
FIG. 3B is a view showing a state that the second body of the mobile terminal of FIG. 1 is rotated.

As shown in FIGS. 3A and 3B, the second body 12 can perform a sliding motion and a rotation motion with respect to the first body 11 by the swivel assembly 100.

FIG. 3A shows a state that the second body 12 performs a sliding motion with respect to the first body 11. The moving unit 120 of the swivel assembly 100 moves along the moving path 200a formed at the second body 12. That is, the second body 12 having the moving path 200a thereon performs a sliding motion with respect to the moving unit 120 of the swivel assembly 100.

FIG. 3B shows a state that the second body 12 performs a rotation motion with respect to the first body 11. Referring to FIG. 3B, the second body 12 does not slide, but rotates with respect to the first body 11. That is, the moving unit of the swivel assembly mounted at the second body performs a relative rotational motion with respect to the fixed unit, but does not slide along the moving path formed at the second body. Here, the moving unit is positioned at the moving path formed on the second body, which is the initial position of the swivel assembly.

A guide portion 300 is further provided so that the second body 12 can independently perform a sliding motion or a rotation motion with respect to the first body 11. The guide portion 300 includes a slide guide 320a formed in the same direction as the moving path 200a (a vertical direction in drawing), and a rotation guide 320b formed in a rotation direction of the swivel assembly 100 (i.e., an arc direction). In the drawing, the slide and rotation guides 320a and 320b are formed at the first body 11.

One end of the slide guide 320a is connected to one end of the rotation guide 320b, but another end of the slide guide 320a is separated from another end of the rotation guide 320b. The slide guide 320a is substantially linear, and the rotation guide 320b is substantially arc-shaped.

A slider 310 for sliding or rotating the second body 12 with respect to the first body 11 along one of the slide and rotation guides 320a and 320b is also mounted at the second body 12. In addition, a slider separation preventing jaw 11a for preventing the slider 310 from being separated from the guide 320a or the guide 320b is further formed at the guide 320a or the guide 320b. The slider separation preventing jaw 11a is formed at an entire portion of the slide guide 320a or the rotation guide 320b, or is formed at a position where the slider 310 is stopped, that is, an initial position, a slid position, and a rotated position of the second body 12.

When the guide portion 300 is provided, the swivel assembly 100 may be mounted at one region of the second body 12 away from the center of a vertical axis of the mobile terminal 10. Here, the guide portion 300 may be disposed at another region of the second body 12 away from the center of the vertical axis of the mobile terminal 10, that is, a position facing the swivel assembly 100. For example, the swivel assembly 100 may be mounted at the region to the right of the center of a vertical axis of the mobile terminal 10, and the guide portion 300 may be disposed at the region to the left of the center of a vertical axis of the mobile terminal 10.

When the second body 12 is rotated with respect to the first body 11, right and left ends of the second body 12 (upper and lower ends when the second body 12 is not rotated) are symmetrical to the center of the vertical axis of the first body 11. Also, the second body 12 can stably perform a sliding motion and a rotation motion with respect to the first body 11. The second body 12 can stably perform a sliding motion and a rotation motion with respect to the first body 11 according to a status of data outputted from an outputting unit 14 (e.g., a calling mode, a VT mode, etc. corresponding to an operation mode).

Figure 4:
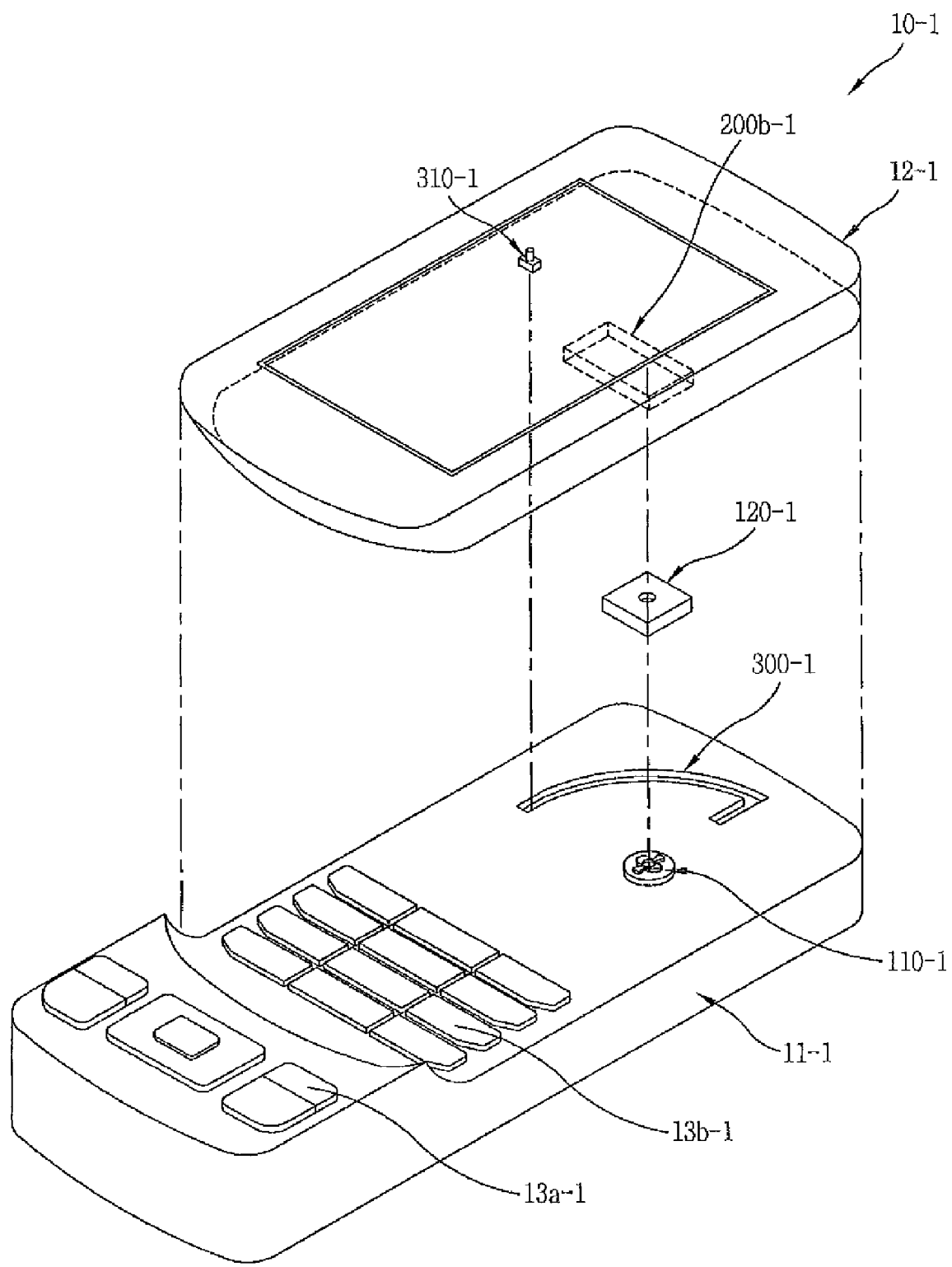
FIG. 4 is an exploded perspective view showing a mobile terminal having a swivel assembly according to a second embodiment of the present disclosure.
Figure 5A:
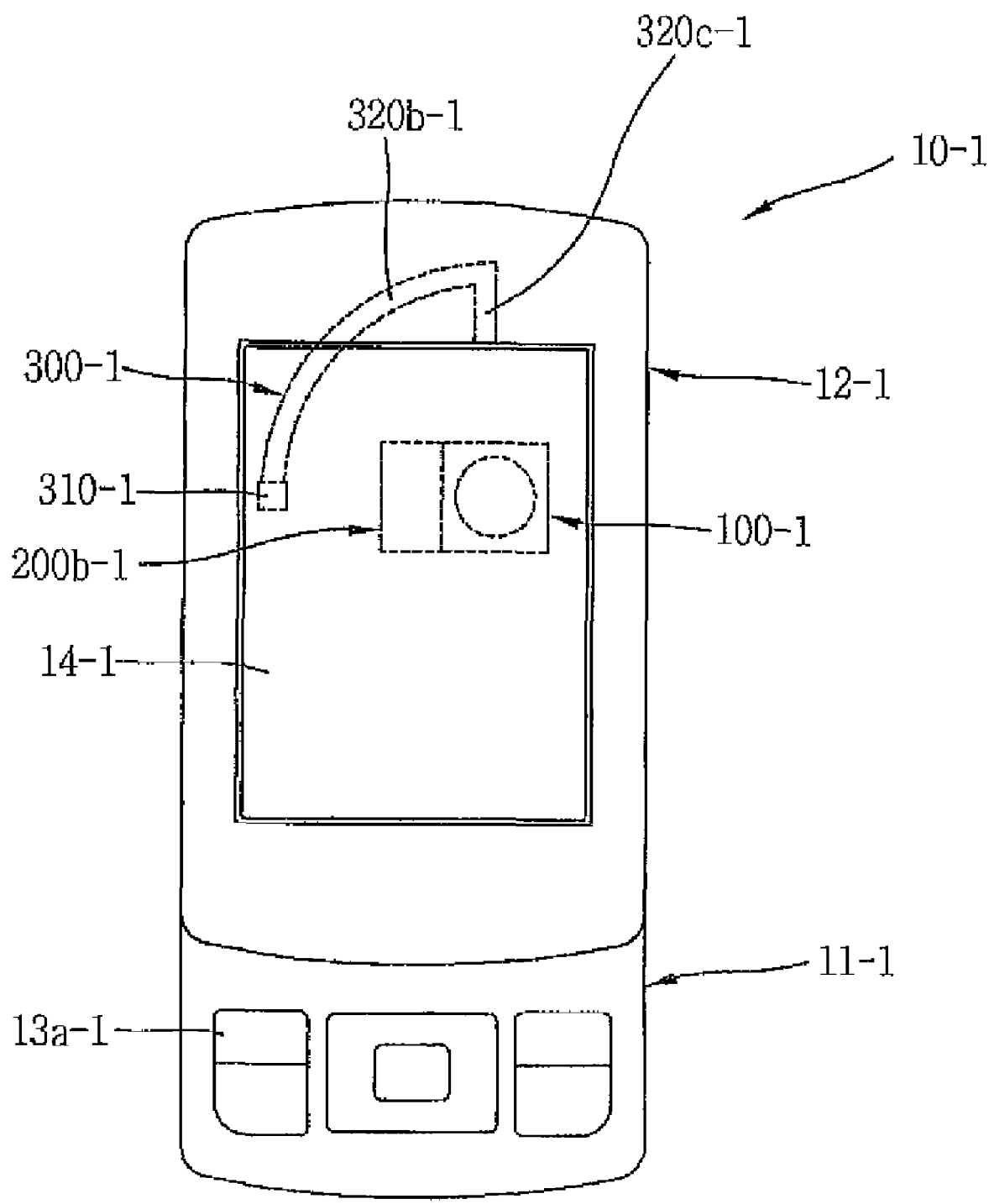
FIG. 5A is a frontal view of the mobile terminal of FIG. 4.
Figure 5B:
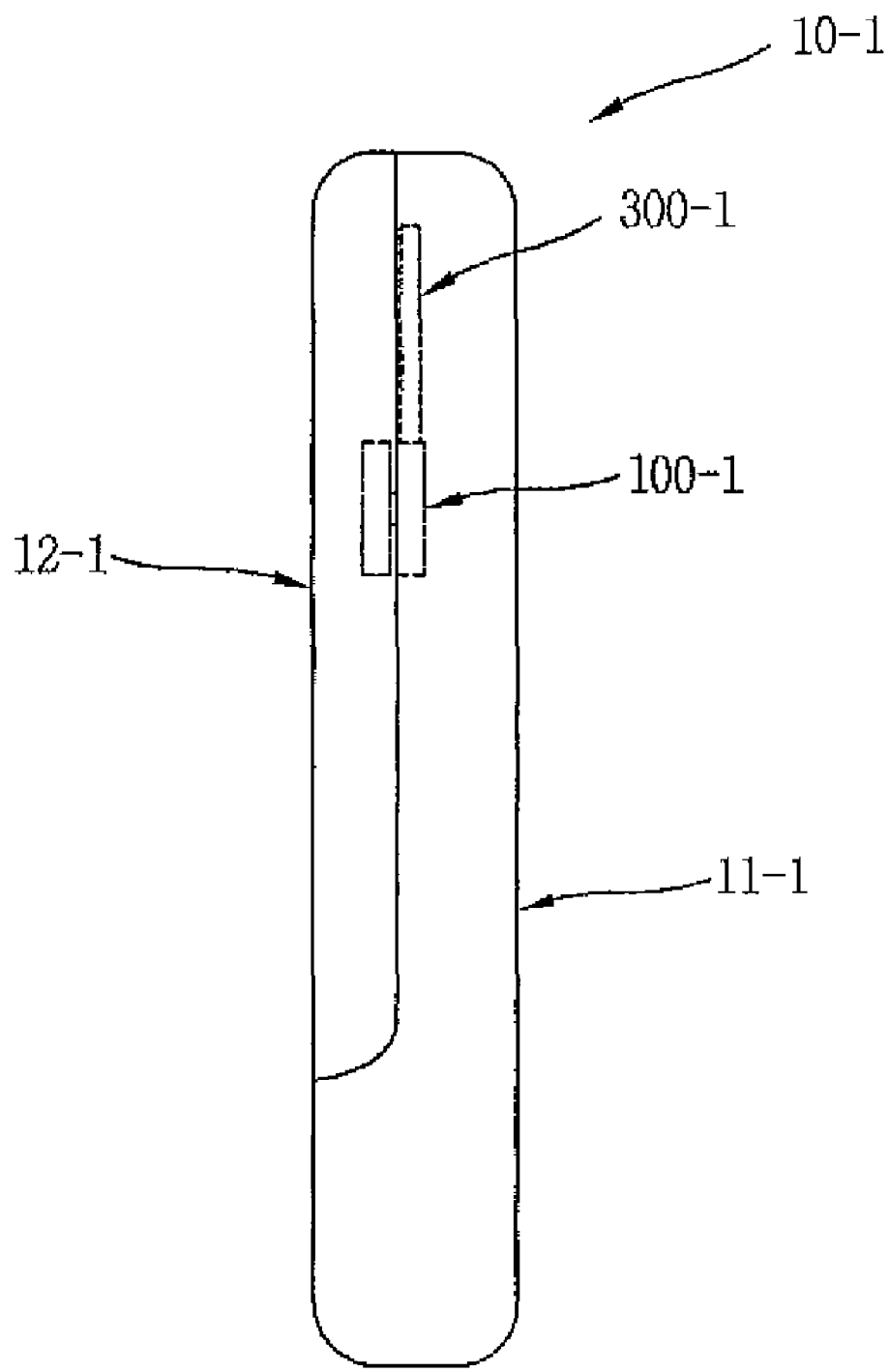
FIG. 5B is a right side view of the mobile terminal of FIG. 4.

FIGS. 4 to 5B show a mobile terminal 10-1 that can perform a sliding motion and a rotation motion according to a second embodiment of the present disclosure. The mobile terminal 10-1 includes a first body 11-1 having inputting units 13a-1 and 13b-1, and a second body 12-1 having an outputting unit 14-1. The second body 12-1 can rotate by a predetermined angle (e.g., 90°) with respect to the first body 11-1, and can slide with respect to the first body 11-1 in a longitudinal direction of the mobile terminal 10-1. In order to slide and rotate the mobile terminal, the two bodies 11-1 and 12-1 are coupled to each other by a swivel assembly 100-1. The swivel assembly 100-1 is configured to move along a moving path 200b-1 formed at one of the first and second bodies 11-1 and 12-1.

FIGS. 4 to 5B show that the moving path 200b-1 is formed at the second body 12-1. The moving path 200b-1 may be formed in a direction perpendicular to the longitudinal direction of the second body 12-1. Further, the swivel assembly 100-1 that performs a sliding motion is coupled to the moving path 200b-1 so that the second body 12-1 can perform a sliding motion with respect to the first body 11-1.

The swivel assembly 100-1 according to the second embodiment has the same configuration as the swivel assembly according to the first embodiment, and thus its detailed explanation will be omitted. A moving unit separation preventing jaw 12a for preventing the moving unit 120 of the swivel assembly 100 from being separated from the moving path 200b-1 is formed at the moving path 200b-1 like in the first embodiment.

Figure 6A:
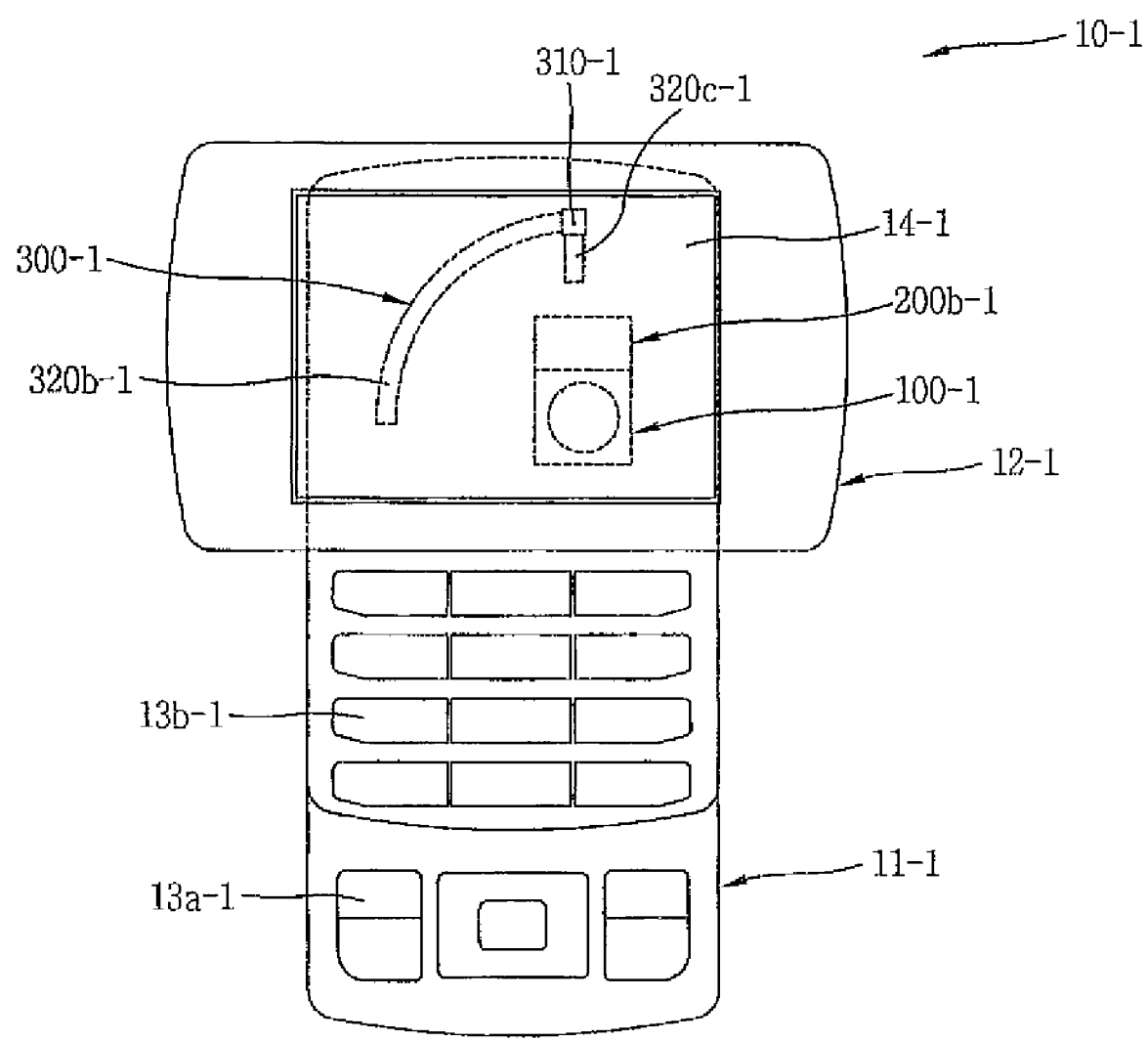
FIG. 6A is a view showing a state that a second body of the mobile terminal of FIG. 4 is rotated.

FIG. 6A shows a state that the second body 12-1 rotates with respect to the first body 11-1. The second body 12-1 can rotate with respect to the first body 11-1 along the moving path 200b-1 under a state that the swivel assembly 100-1 is initially positioned at the moving path 200b-1 formed at the second body 12-1 (refer to FIG. 3A). That is, the moving unit 120 can rotate with respect to the fixed unit 110 under a state that the swivel assembly 100-1 is initially fixed.

Figure 6B:
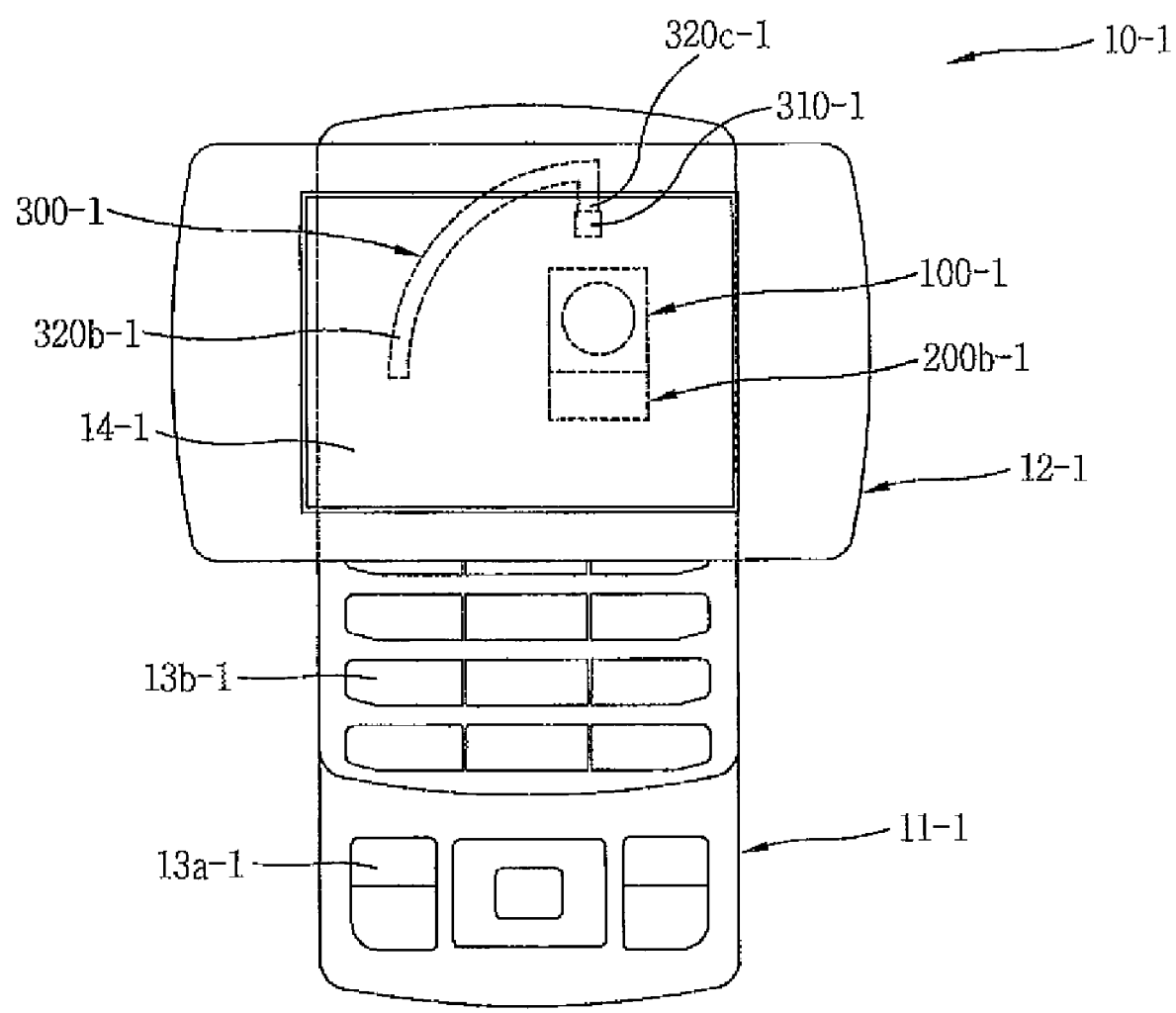
FIG. 6B is a view showing a state that the rotated second body of the mobile terminal of FIG. 4 is downwardly slid.

FIG. 6B is a view showing a state that the moving unit 120 moves along the moving path 200b-1 formed at the second body 12-1 under a state that the second body 12-1 has rotated with respect to the first body 11-1. That is, the second body 12-1 having the moving path 200b-1 thereon can downwardly move by being slid with respect to the moving unit 120 of the swivel assembly 100-1.

In order for the second body 12-1 to independently perform a sliding motion or a rotation motion with respect to the first body 11-1, a guide portion 300-1 is further provided. The guide portion 300-1 includes a rotation guide 320b-1 formed in a direction corresponding to a rotation direction of the swivel assembly 100-1 (i.e., the arc direction), and a slide guide 320c-1 formed in the same direction as the moving path 200a-1 (i.e., the vertical direction). The rotation and the slide guides 320b-1 and 320c-1 are formed at the first body 11-1. The rotation guide 320b-1 is substantially arc-shaped, and the slide guide 320c-1 may be substantially linear. One end of the rotation guide 320b-1 is connected to one end of the slide guide 320c-1, but another end of the rotation guide 320b-1 is separated from another end of the slide guide 320c-1.

Figure 16:
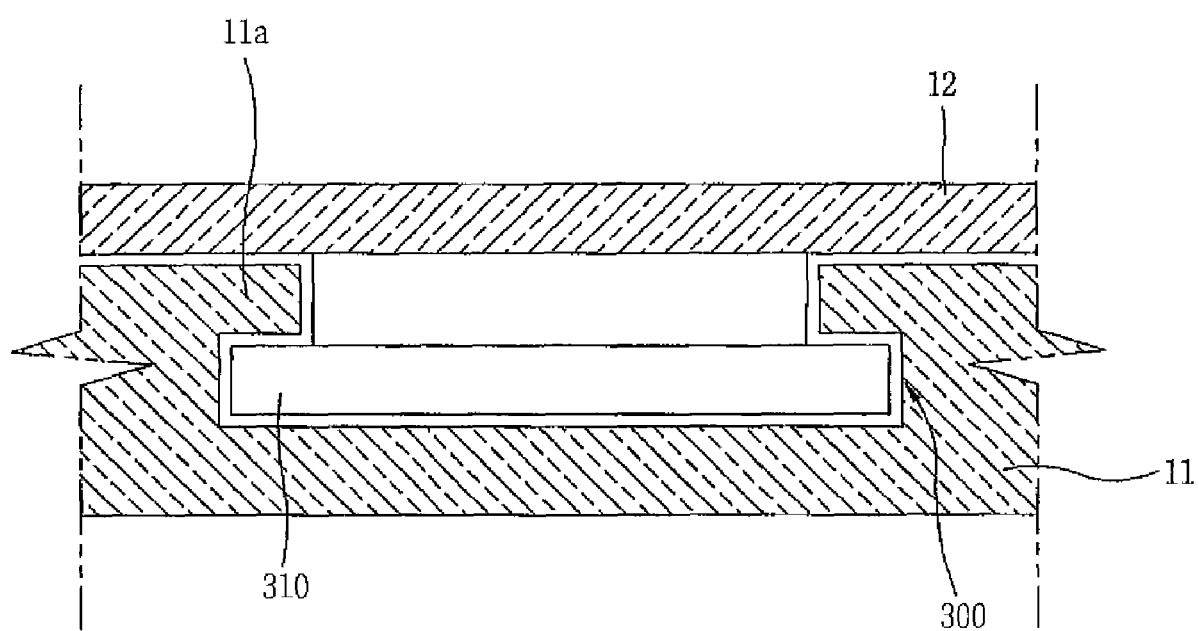
FIG. 16 is a view showing that a slider is applied to the mobile terminal having the swivel assembly according to the present disclosure.

A slider 310-1 for sliding or rotating the second body 12-1 along one of the rotation and slide guides 320b-1 and 320c-1 may be mounted at the second body 12-1. As shown in FIG. 16, a slider separation preventing jaw 11a for preventing the slider 310-1 from being separated from the rotation and slide guides 320b-1 and 320c-1 may be further formed at the rotation and slide guides 320b-1 and 320c-1.

The second body 12-1 can stably perform a sliding motion or a rotation motion with respect to the first body 11-1 according to a status of data outputted from an outputting unit 14-1 (e.g., a calling mode, a VT mode, etc. corresponding to an operation mode).

Figure 7:
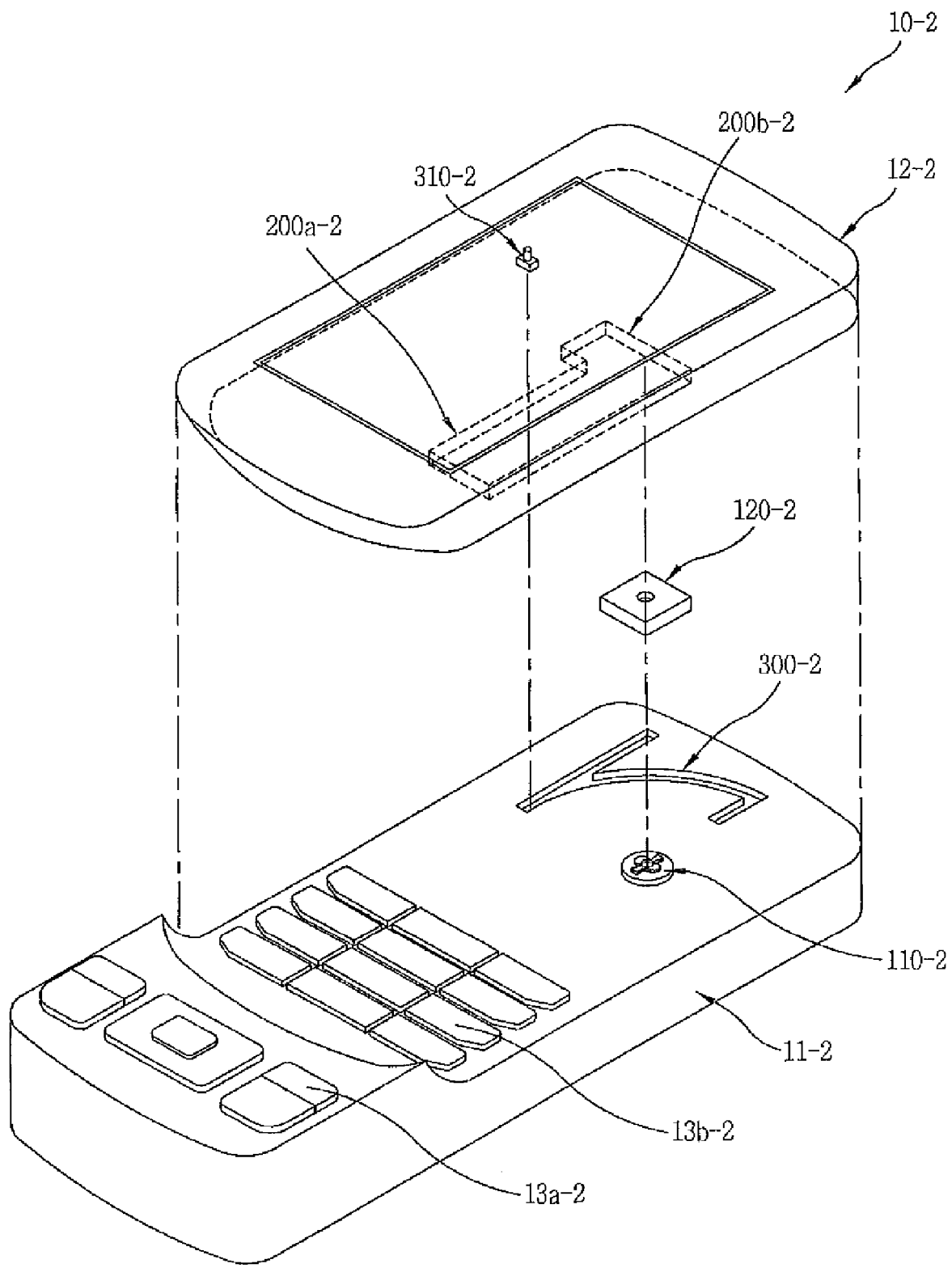
FIG. 7 is an exploded perspective view showing a mobile terminal having a swivel assembly according to a third embodiment of the present disclosure.
Figure 8A:
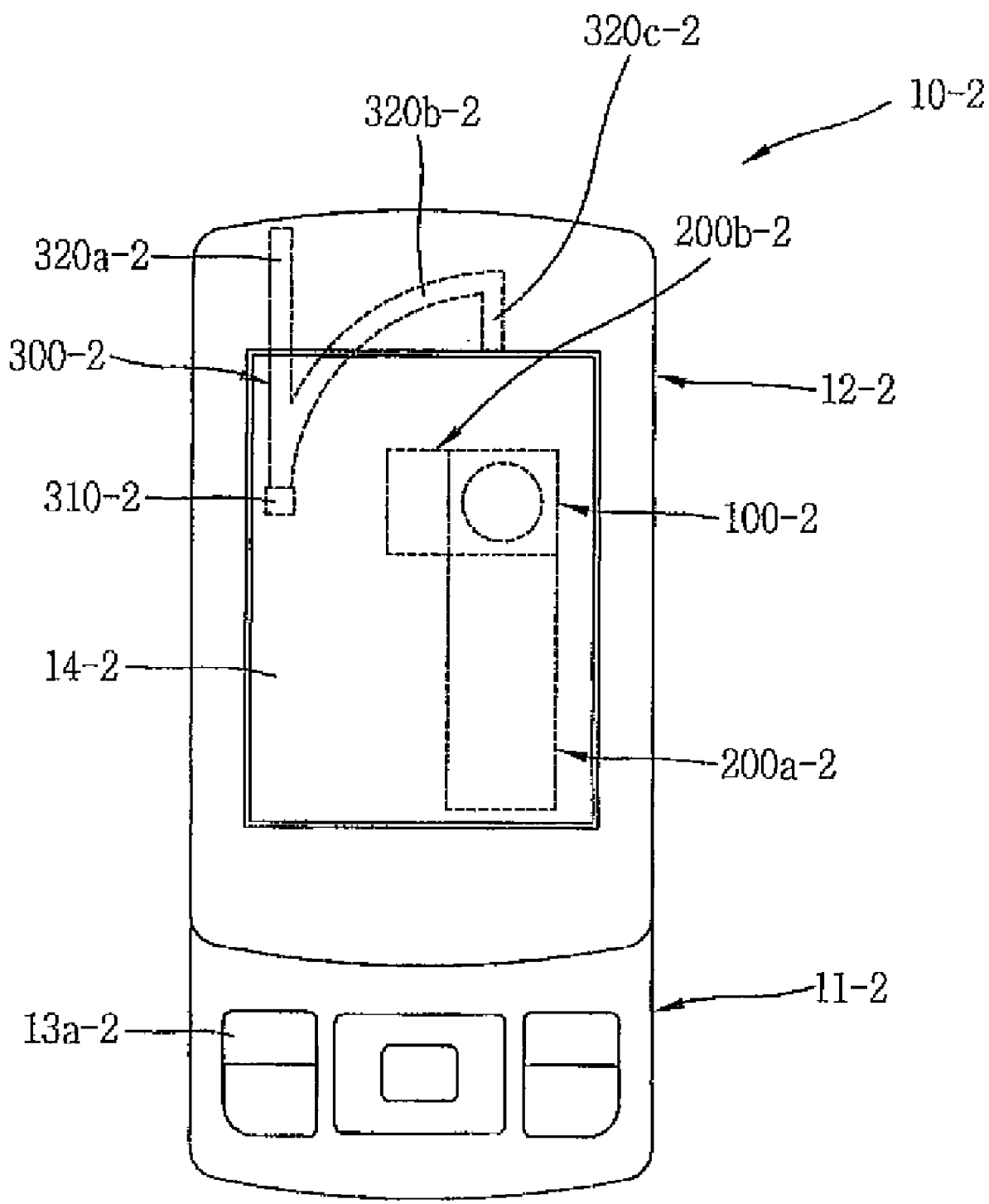
FIG. 8A is a frontal view of the mobile terminal of FIG. 7.
Figure 8B:
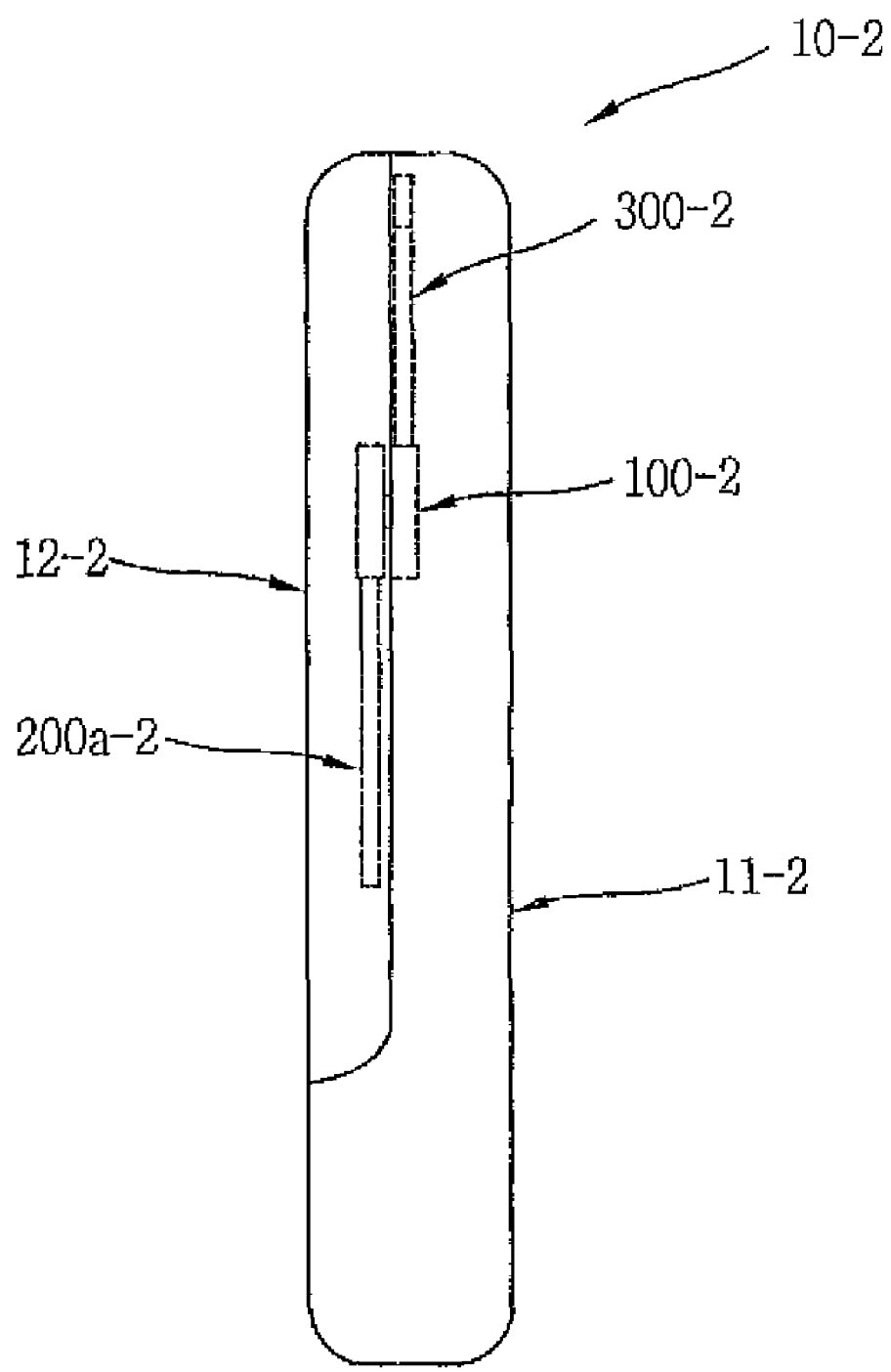
FIG. 8B is a right side view of the mobile terminal of FIG. 7.

FIGS. 7 to 8B show a mobile terminal 10-2 that performs a sliding motion and a rotation motion according to a third embodiment of the present invention. The mobile terminal 10-2 includes a first body 11-2 having inputting units 13a-2 and 13b-2, and a second body 12-2 having an outputting unit 14-2.

The second body 12-2 slides with respect to the first body 11-1 in a longitudinal direction of the mobile terminal 10-2 (a vertical direction), or rotates by a predetermined angle (e.g., 90°) with respect to the first body 11-1 then slide with respect to the first body 11-1 in a longitudinal direction of the mobile terminal 10-2 (a vertical direction). In order to slide and rotate the mobile terminal, the two bodies 11-2 and 12-2 are coupled to each other by a swivel assembly 100-2. The swivel assembly 100-2 is configured to move along first and second moving paths 200a-2 and 200b-2 formed at one of the first and second bodies 11-2 and 12-2. The swivel assembly 100-2 has the same configuration as the aforementioned one, and thus its detailed explanation will be omitted.

FIGS. 7 to 8B show that the first and second moving paths 200a-2 and 200b-2 are formed at the second body 12-2. The first and second moving paths 200a-2 and 200b-2 are formed at the second body 12-2 in a longitudinal direction and in a direction perpendicular to the longitudinal direction, respectively. One end of the first moving path 200a-2 is connected to one end of the second moving path 200b-2.

The swivel assembly 100-2 that performs a sliding motion is coupled to the first and second moving paths 200a-2 and 200b-2 so that the second body 12-2 performs a sliding motion with respect to the first body 11-2 in horizontal and vertical directions along the first and second moving paths 200a-2 and 200b-2. A moving unit separation preventing jaw 12a for preventing the moving unit 120 of the swivel assembly 100 from being separated from the first and second moving paths 200a-2 and 200b-2 is formed at the first and second moving paths 200a-2 and 200b-2 like in FIG. 16.

Figure 9A:
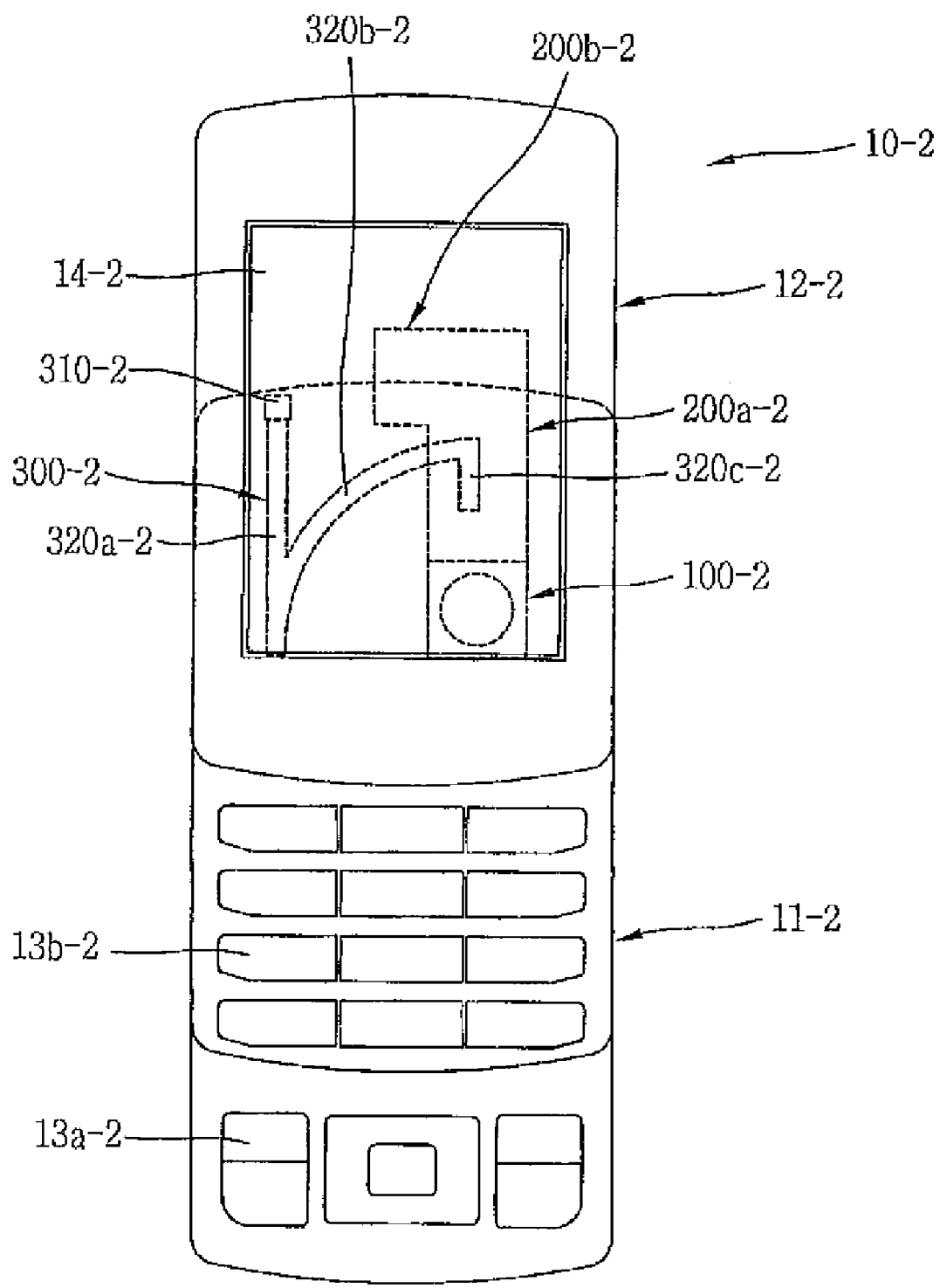
FIG. 9B is a view showing a state that the second body of the mobile terminal of FIG. 7 is rotated.
FIG. 9C is a view showing a state that the rotated second body of the mobile terminal of FIG. 7 is downwardly moved by being slid.

FIG. 9A shows a state that the second body 12-2 performs a sliding motion with respect to the first body 11-2. The moving unit 120 of the swivel assembly 100-2 moves along the first moving path 200a-2 formed at the second body 12-2. That is, the second body 12-2 having the first moving path 200a-2 thereon performs a sliding motion with respect to the moving unit 120 of the swivel assembly 100-2.

Figure 9B:
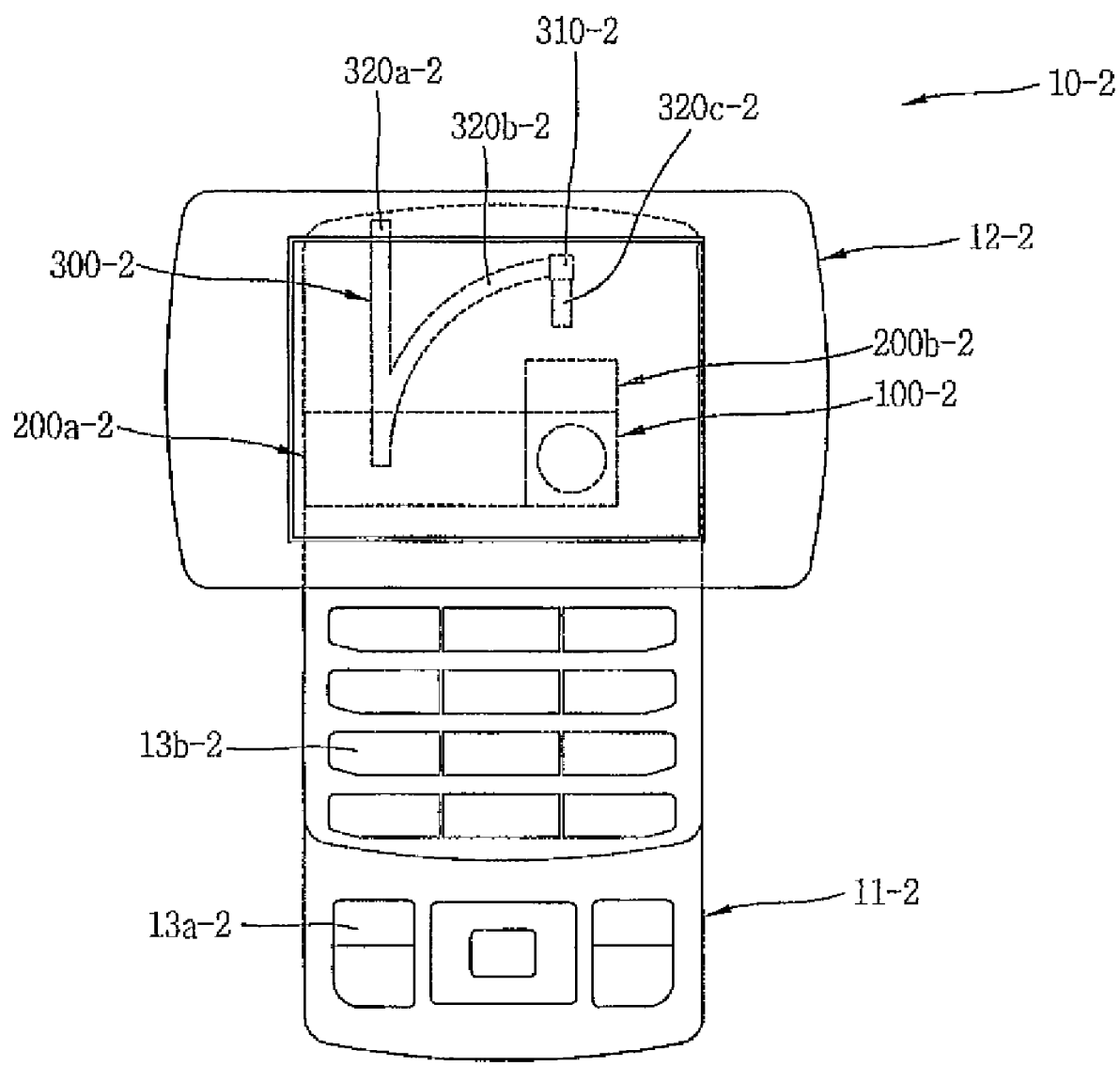

FIG. 9B is a view showing a state that the second body 12-2 of the mobile terminal of FIG. 7 rotates with respect to the first body 11-2. The second body 12-2 rotates with respect to the first body 11-2 without performing a sliding motion under a state that the swivel assembly 100-2 is initially positioned at the moving path 200a formed at the second body 12-2 (FIG. 9A). That is, the moving unit 120 rotates with respect to the fixed unit 110 under a state that the swivel assembly 100-2 is initially fixed.

Figure 9C:
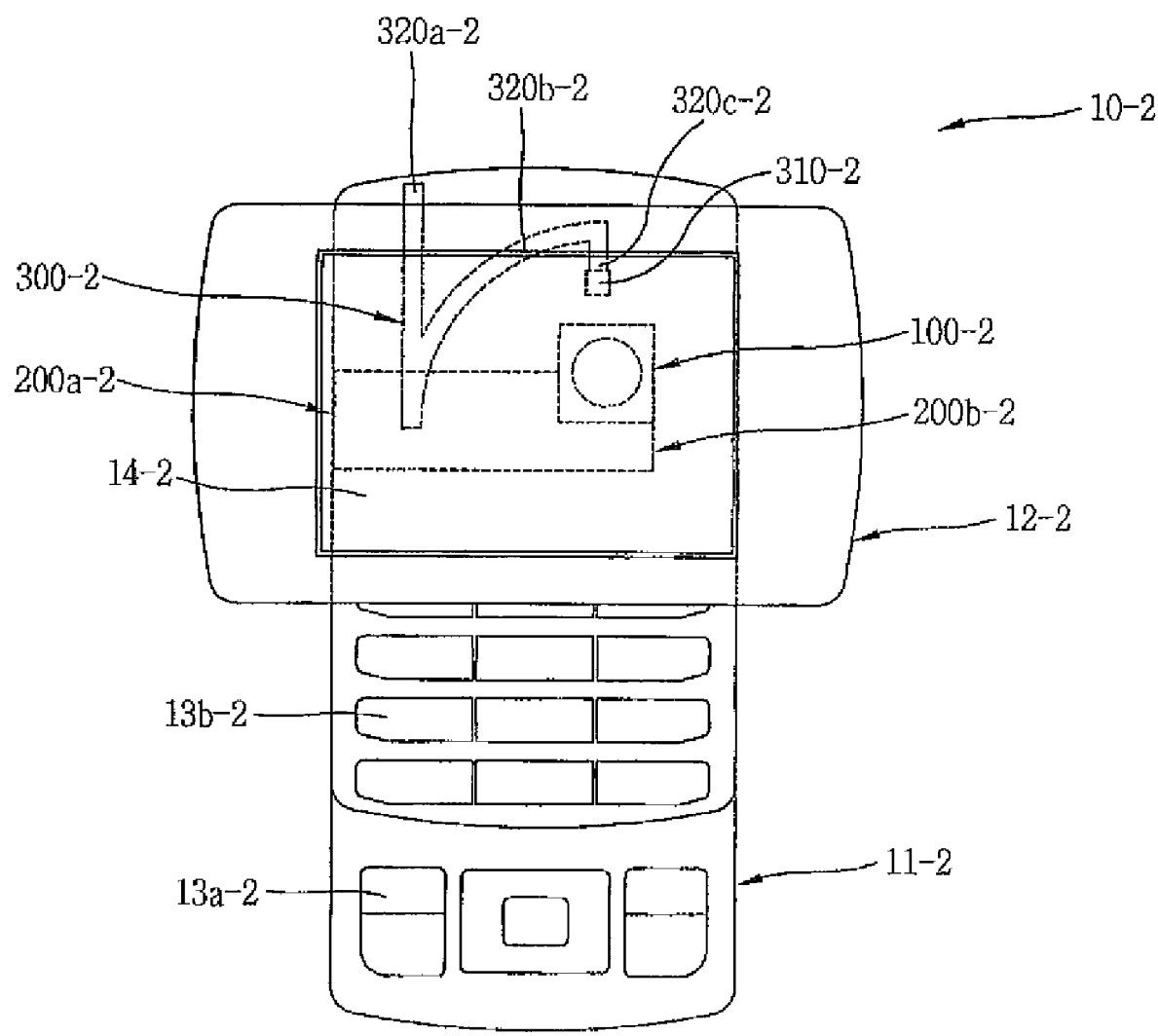
Figure 10:
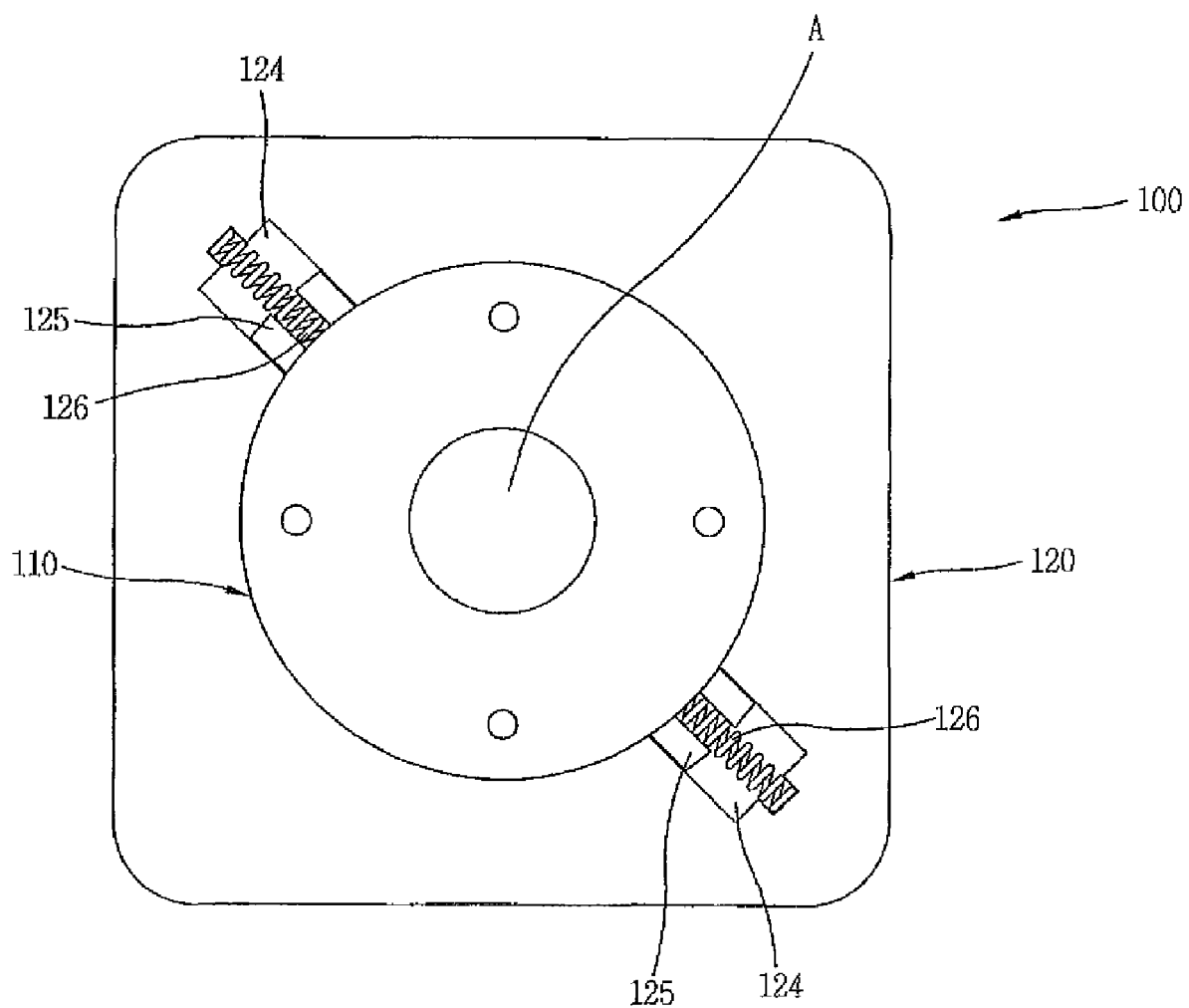
FIG. 10 is a planar view showing a swivel assembly applied to the mobile terminals according to each embodiment of the present disclosure.

FIG. 9C is a view showing a state that the moving unit 120 moves along the second moving path 200b-2 formed at the second body 12-2 under a state that the second body 12-2 has rotated with respect to the first body 11-2. That is, the second body 12-2 having the moving path 200b thereon is downwardly slid with respect to the moving unit 120 of the swivel assembly 100-2. A guide portion 300-2 is further provided so that the second body 12-2 independently performs a sliding motion or a rotation motion with respect to the first body 11-2.

The guide portion 300-2 includes a first slide guide 320a-2 formed in the same direction as the first moving path 200a-2 (a vertical direction in drawing) along which the second body 12-2 performs a sliding motion, a rotation guide 320b-2 formed in a rotation direction of the swivel assembly 100-2 (i.e., an arc direction), and a second slide guide 320-c formed in the same direction as the first moving path 200a-2 (a vertical direction). The first slide guide 320a-2 and the second slide guide 320-c are substantially linear, and the rotation guide 320b-2 is substantially arc-shaped.

The first slide, rotation and second slide guides 320a-2, 320b-2 and 320c-2 are formed at the first body 11-2 like in the aforementioned embodiments. One end of the first slide guide 320a-2 is connected to one end of the rotation guide 320b-2 and another end of the rotation guide 320b-2 is connected to one end of the second slide guide 320c-2. A slider 310-2 rotating or sliding along one of the first slide, rotation and second slide guides 320a-2, 320b-2 and 320c-2 are mounted at the second body 12-2 like in the first embodiment. A slider separation preventing jaw 11a for preventing the slider 310-2 from being separated from the first slide, rotation and second slide guides 320a-2, 320b-2 and 320c-2 is further formed at the first slide, rotation and second slide guides 320a-2, 320b-2 and 320c-2, respectively.

The second body 12-2 can stably perform a sliding motion and a rotation motion with respect to the first body 11-2 according to a status of data outputted from an outputting unit 14-2 (e.g., a calling mode, a VT mode, etc. corresponding to an operation mode).

The body having the outputting unit slides or rotates so as to perform an output in a horizontal direction or in a vertical direction according to a user's intention. When the body having the outputting unit is disposed in a vertical direction or in a horizontal direction after being slid or rotated, the body having the outputting unit has no gap from one body having an inputting unit. Here, the mobile terminal is prevented from being fluctuated thus to implement a stable mechanism. When the body having the outputting unit is disposed in a vertical direction or in a horizontal direction after being slid or rotated, an entire size of the mobile terminal is reduced.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features are embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a first body;
    a second body; and
    a swivel assembly for coupling the first and second bodies to each other so as to rotate and slide the first and second bodies with respect to each other,
    wherein one of the first body and the second body comprises a moving path formed along a sliding direction thereof,
    wherein the swivel assembly comprises:
        a moving unit inserted and slidably coupled to the moving path; and
        a fixed unit mounted at one side of another one of the first body and the second body, the another one of the first body and the second body not having the moving path thereon, and rotatably coupled to the moving unit, and
    wherein the moving path is configured to guide a sliding motion of the moving unit when the first and second bodies linearly slide with respect to each other.

2. The mobile terminal of claim 1, wherein the swivel assembly further comprises:
    a cam member formed at one side of the fixed unit,
    a cam receiving portion for receiving the cam member, the cam receiving portion formed at the moving unit,
    one or more stopper receiving portions formed at the cam receiving portion, and
    a stopper supported by an elastic member, the stopper mounted at the stopper receiving portion.

3. The mobile terminal of claim 2, wherein a fixed unit opening and a moving unit opening are respectively formed at central portions of the fixed unit and the moving unit, and the fixed unit and the moving unit openings are communicated with each other when the fixed unit and the moving unit are coupled to each other.

4. The mobile terminal of claim 2, wherein the cam member comprises:
    a plurality of convex portions and
    a plurality of concave portions, wherein the convex portions and the concave portions are alternately formed with each other.

5. The mobile terminal of claim 2, wherein the cam member and the cam receiving portion are respectively provided with a cam member protrusion and a cam receiving portion protrusion.

6. The mobile terminal of claim 1, wherein the swivel assembly is coupled to the mobile terminal by a coupling member.

7. The mobile terminal of claim 1, wherein the swivel assembly is mounted at a right side or a left side of a vertical axis of the mobile terminal in a longitudinal direction.

8. The mobile terminal of claim 1, wherein a linear guide and an arc-shaped guide are provided at the another one of the first body and the second body not having the moving path thereon, and a slider sliding along the linear and arc-shaped guides is provided at the one of the first body and the second body having the moving path thereon.

9. The mobile terminal of claim 1, wherein a linear guide and an arc-shaped guide are provided at the one of the first body and the second body having the moving path thereon, and a slider sliding along the linear and arc-shaped guides is mounted at the another one of the first body and the second body not having the moving path thereon.

10. The mobile terminal of claim 1, wherein the moving path is formed at the one of the first body and the second body in a longitudinal direction and a direction perpendicular to the longitudinal direction,
   wherein a first linear guide, an arc-shaped guide extending from an end of the one linear guide, and a second linear guide extending from the arc-shaped guide are formed at the another one of the first body and the second body, and
   wherein a slider that moves along the first linear, arc-shaped and second linear guides is mounted at the other one of the first body and the second body facing the one of the first body and second body.

11. The mobile terminal of claim 1, wherein a separation preventing jaw for preventing the swivel assembly from being separated from the moving path is formed at the moving path.

12. The mobile terminal of claim 1, wherein an opening is formed at the moving path in a longitudinal direction of the one of the first body and second body,
   wherein an opening connected to the opening formed at the moving path is formed at the another one of the first body and second body where the fixed unit is mounted, and
   wherein the moving unit and the fixed unit of the swivel assembly are respectively provided with an opening communicated with the opening of the moving path and the opening of the another one of the first body and second body where the fixed unit is mounted.

13. The mobile terminal of claim 1, wherein one or more linear guides and an arc-shaped guide are formed at the another one of the first body and second body,
   wherein a slider that moves along the linear and arc-shaped guides is mounted at the one of the first body and second body, and
   wherein a separation preventing jaw is formed at an entire region of the linear and arc-shaped guides or at a partial region of the linear and arc-shaped guides where the slider is stopped.

14. A mobile terminal, comprising:
   a first body;
   a second body; and
   a swivel assembly for coupling the first and second bodies to each other so as to rotate and slide the first and second bodies with respect to each other,
   wherein one of the first body and the second body comprises a moving path formed along a sliding direction thereof,
   another one of the first body and the second body not having the moving path thereon comprises one or more guides of a linear shape and an arc shape,
   the one of the first body and the second body having the moving path thereon comprises a slider that moves along the guides,
   wherein the swivel assembly comprises:
      a moving unit inserted and slidably coupled to the moving path; and
      a fixed unit mounted at one side of the another one of the first body and the second body not having the moving path thereon, and rotatably coupled to the moving unit, and
   wherein the moving path is configured to guide a sliding of the moving unit when the first and second bodies linearly slide with respect to each other.

15. The mobile terminal of claim 14, wherein the moving path is formed at the one of the first body and the second body in a longitudinal direction.

16. The mobile terminal of claim 14, wherein the moving path is formed at the one of the first body and the second body in a direction perpendicular to the longitudinal direction of the one of the first body and the second body.

17. The mobile terminal of claim 14, wherein the moving path is formed at the one of the first body and the second body in a longitudinal direction, and in a direction perpendicular to the longitudinal direction by being extended from one end of the moving path.

18. The mobile terminal of claim 14, wherein a cam member is formed at one side of the fixed unit, a cam receiving portion for receiving the cam member is formed at the moving unit, one or more stopper receiving portions are formed at the cam receiving portion, and a stopper supported by an elastic member is mounted at the stopper receiving portion.

19. The mobile terminal of claim 14, wherein the swivel assembly comprises:
   the fixed unit having a cam member, wherein the cam member comprises one or more convex portions and concave portions, and one or more protrusions;
   the moving unit having a cam receiving portion for receiving the cam member at one side thereof, and one or more stopper receiving portions formed at the cam receiving portion; and
   a stopper disposed at the stopper receiving portion, and supported by an elastic member.

20. The mobile terminal of claim 14, wherein the swivel assembly is mounted at one side based on the center of a vertical axis of the mobile terminal, and the guide portion is disposed at another side based on the center of a vertical axis of the mobile terminal.

* * * * *